United States Patent
Jin et al.

(10) Patent No.: US 8,654,457 B2
(45) Date of Patent: Feb. 18, 2014

(54) WIDE-ANGLE OPTICAL SYSTEM, AND IMAGING DEVICE

(75) Inventors: Makoto Jin, Sakai (JP); Keiji Matsusaka, Osaka (JP); Toru Nakatani, Uda (JP)

(73) Assignee: Konica Minolta Opto, Inc., Tokyo (JP)

( * ) Notice: Subject to any disclaimer, the term of this patent is extended or adjusted under 35 U.S.C. 154(b) by 482 days.

(21) Appl. No.: 13/001,231

(22) PCT Filed: Jun. 15, 2009

(86) PCT No.: PCT/JP2009/060851
§ 371 (c)(1),
(2), (4) Date: Dec. 23, 2010

(87) PCT Pub. No.: WO2010/001713
PCT Pub. Date: Jan. 7, 2010

(65) Prior Publication Data
US 2011/0102541 A1  May 5, 2011

(30) Foreign Application Priority Data
Jun. 30, 2008  (JP) ................... 2008-170605

(51) Int. Cl.
*G02B 9/60* (2006.01)
*G02B 9/56* (2006.01)

(52) U.S. Cl.
CPC ... *G02B 9/60* (2013.01); *G02B 9/56* (2013.01)
USPC ......................................... 359/763; 359/770

(58) Field of Classification Search
USPC ......... 359/682, 691, 714, 746, 753, 676, 754, 359/763–770, 793
See application file for complete search history.

(56) References Cited

U.S. PATENT DOCUMENTS

| | | | |
|---|---|---|---|
| 5,398,136 A * | 3/1995 | Ohzawa et al. | 359/714 |
| 6,867,933 B2 * | 3/2005 | Matsusaka | 359/783 |
| 8,134,787 B2 * | 3/2012 | Saitoh | 359/753 |
| 2009/0002849 A1 * | 1/2009 | Kim et al. | 359/749 |
| 2009/0009888 A1 * | 1/2009 | Asami | 359/770 |

FOREIGN PATENT DOCUMENTS

| | | |
|---|---|---|
| JP | 08-101340 | 4/1996 |
| JP | 10-111454 | 4/1998 |
| JP | 11-305125 | 11/1999 |
| JP | 2000-89115 | 3/2000 |
| JP | 2003-344773 | 12/2003 |
| JP | 2005-227426 | 8/2005 |
| JP | 2006-259704 | 9/2006 |
| JP | 2006-284620 | * 10/2006 |
| JP | 2007-249073 | 9/2007 |
| JP | 2009-31762 | 2/2009 |

* cited by examiner

*Primary Examiner* — Thong Nguyen
(74) *Attorney, Agent, or Firm* — Cozen O'Connor

(57) ABSTRACT

The present invention provides a wide-angle optical system constituted of, in order from the object side to the image side, front group 11, stop 12, and rear group 13. The front group 11 is constituted, in order from the object side to the image side, of first lens 111 having negative optical power, second lens 112 having negative optical power, and third lens 113 having positive optical power. The rear group 13 is constituted, in order from the object side to the image side, of fourth lens 131 having positive optical power, and fifth lens 132 having negative optical power. The opposite surface from the stop of each of the paired lenses 113 and 131 arranged at the both sides of the stop 12 is a convex surface.

13 Claims, 32 Drawing Sheets

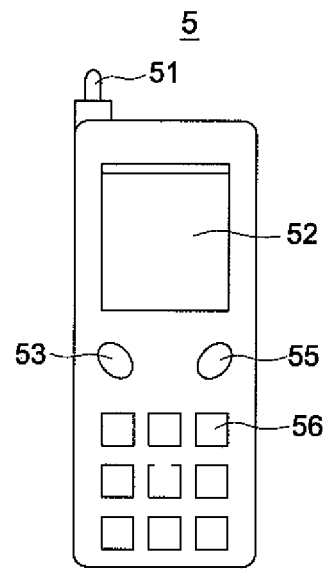
FIG. 3A
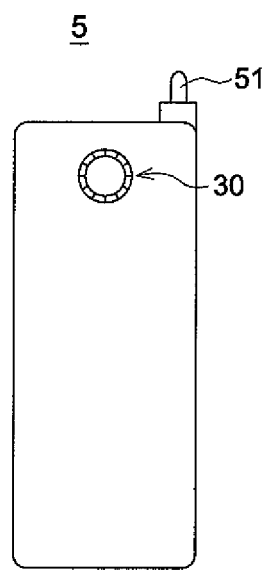
FIG. 3B
FIG. 4
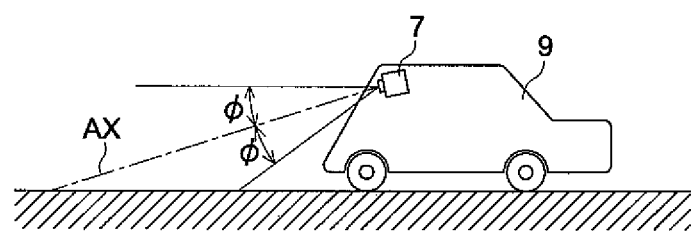

FIG. 15A SPHERICAL ABERRATION DIAGRAM

FIG. 15B ASTIGMATISM DIAGRAM

FIG. 15C DISTORTION DIAGRAM

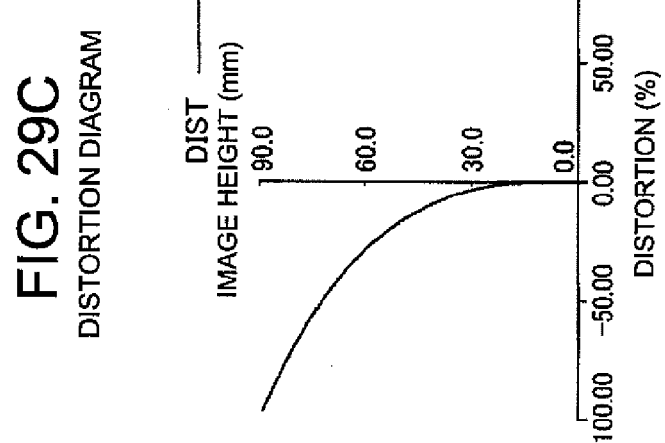
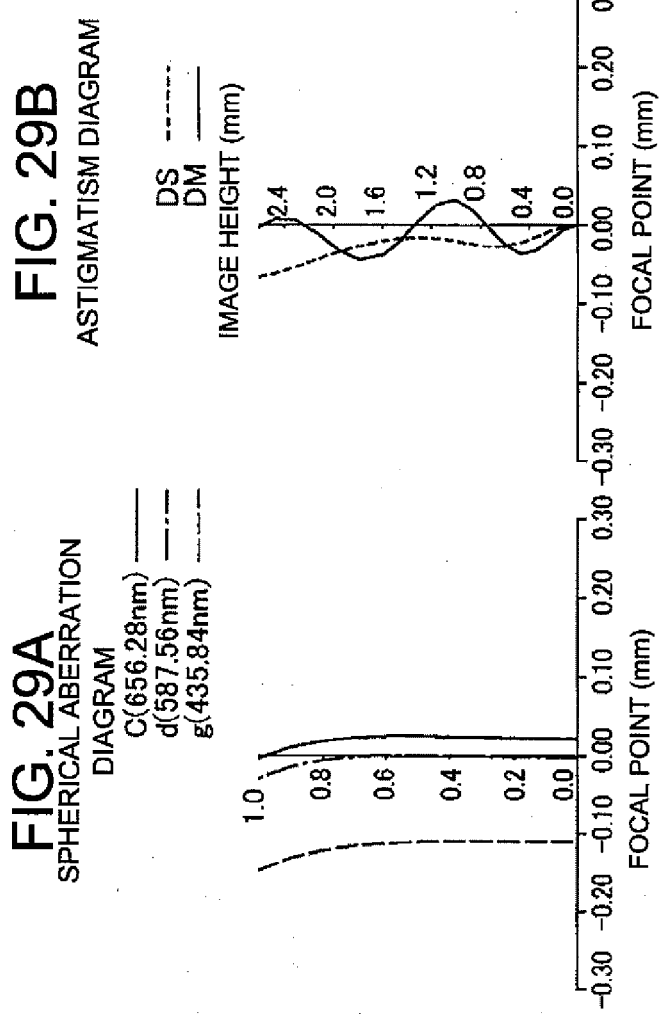

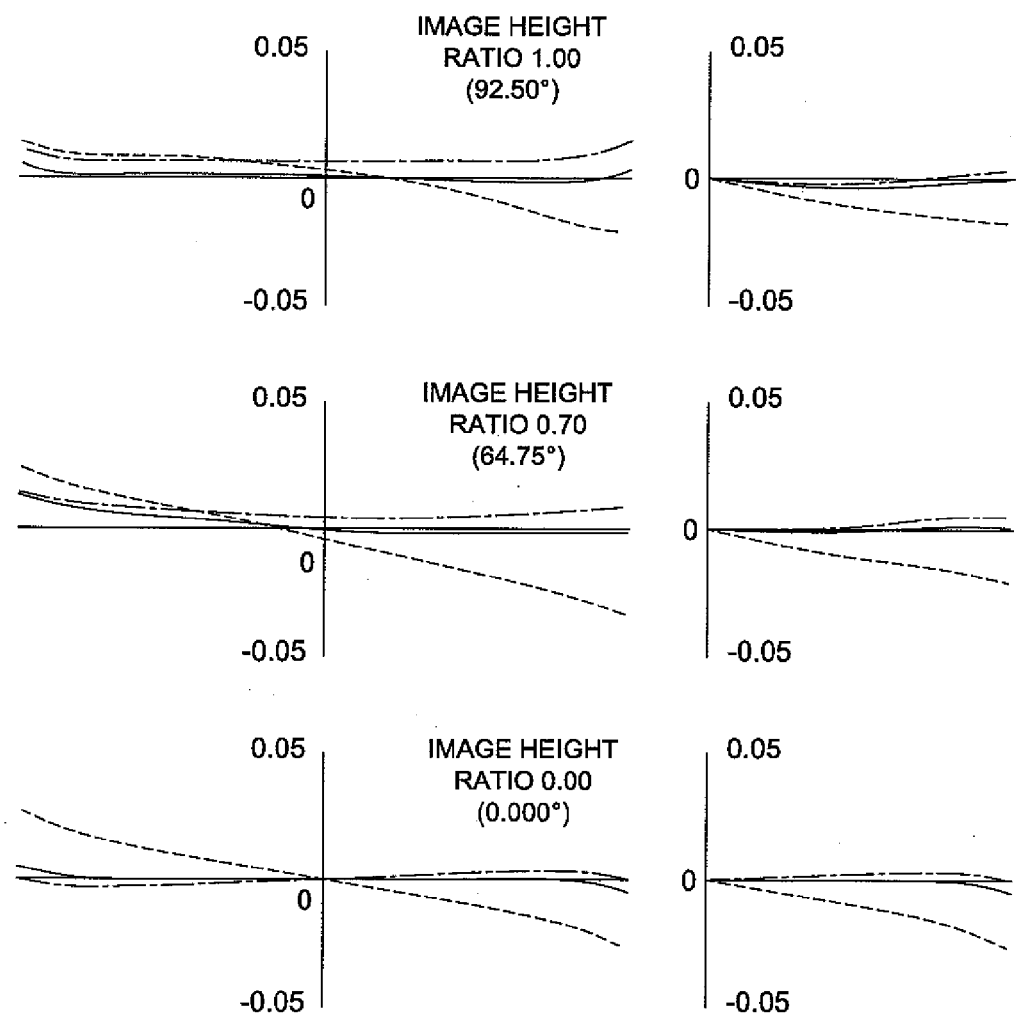

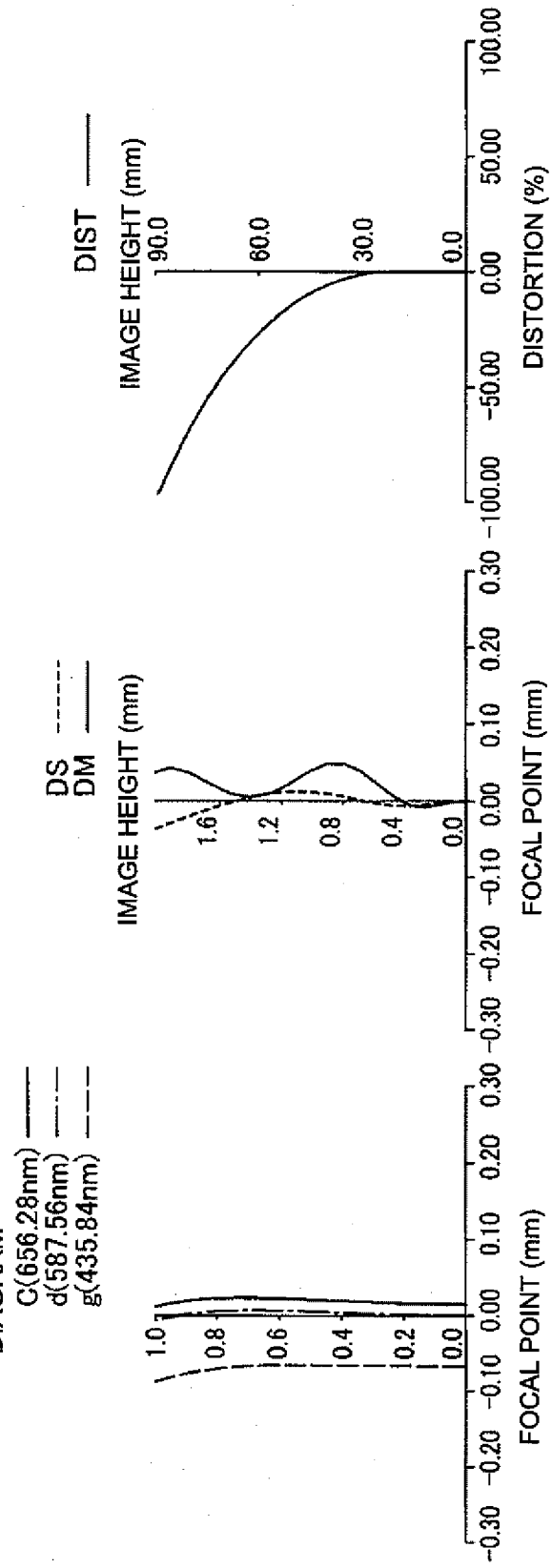

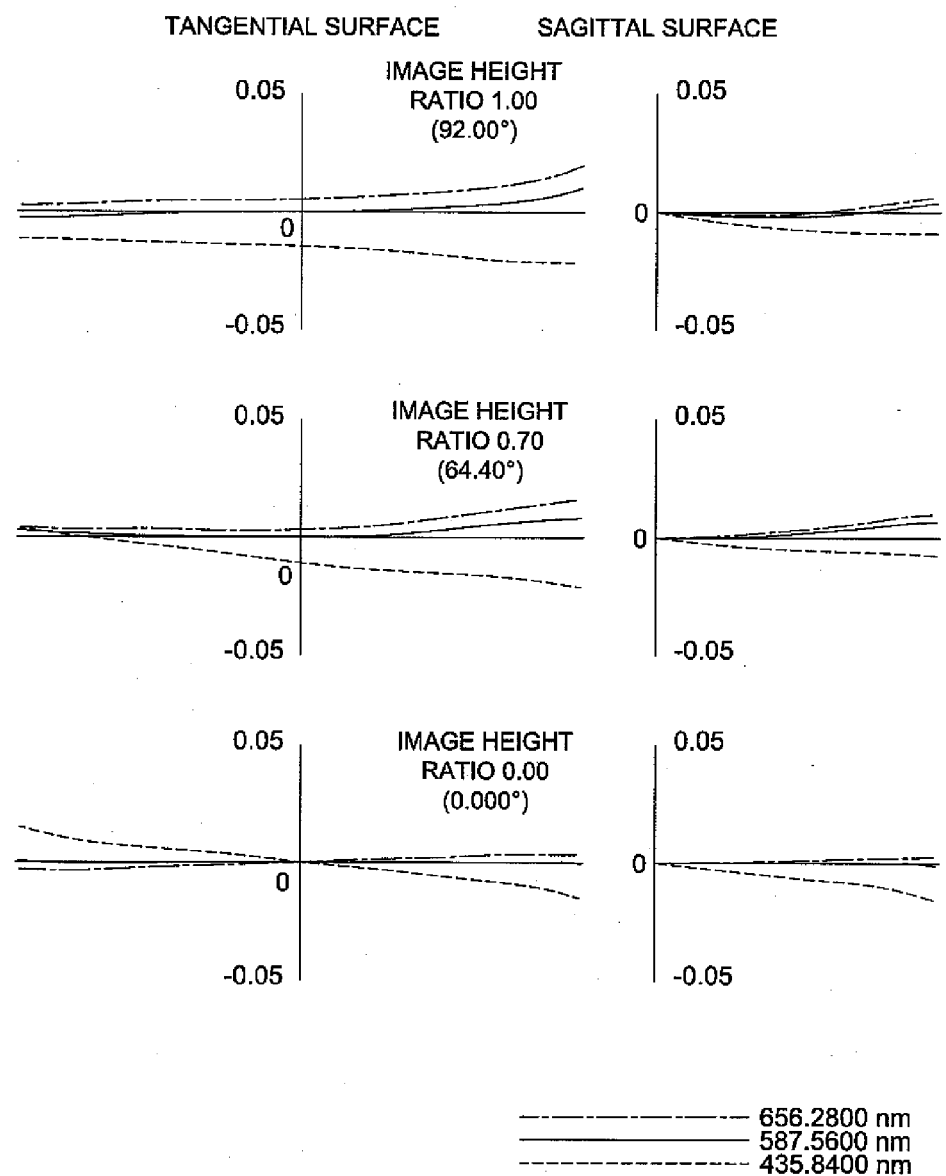

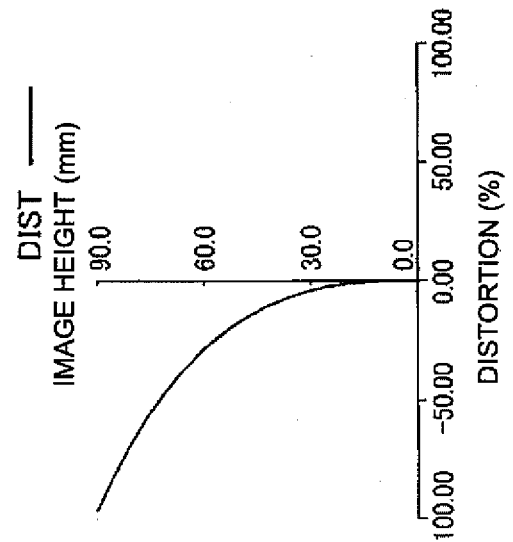
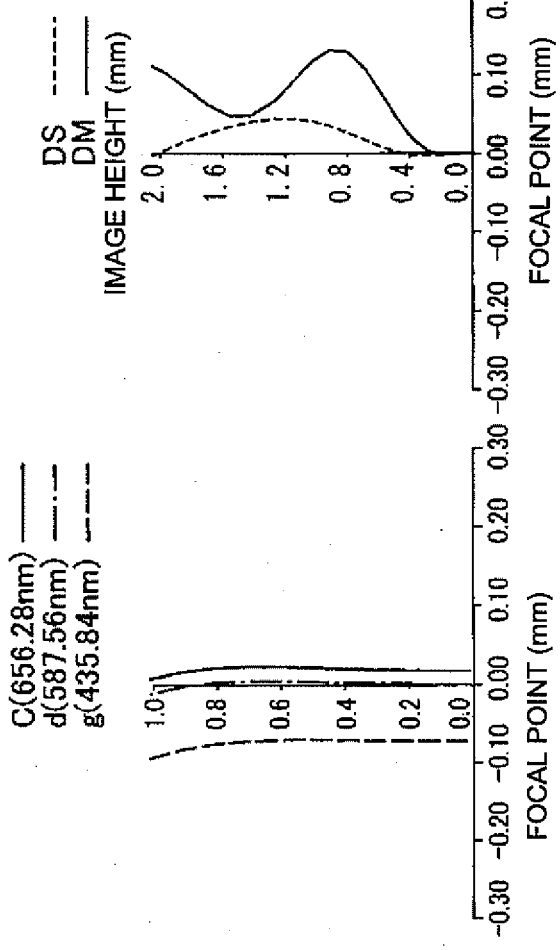

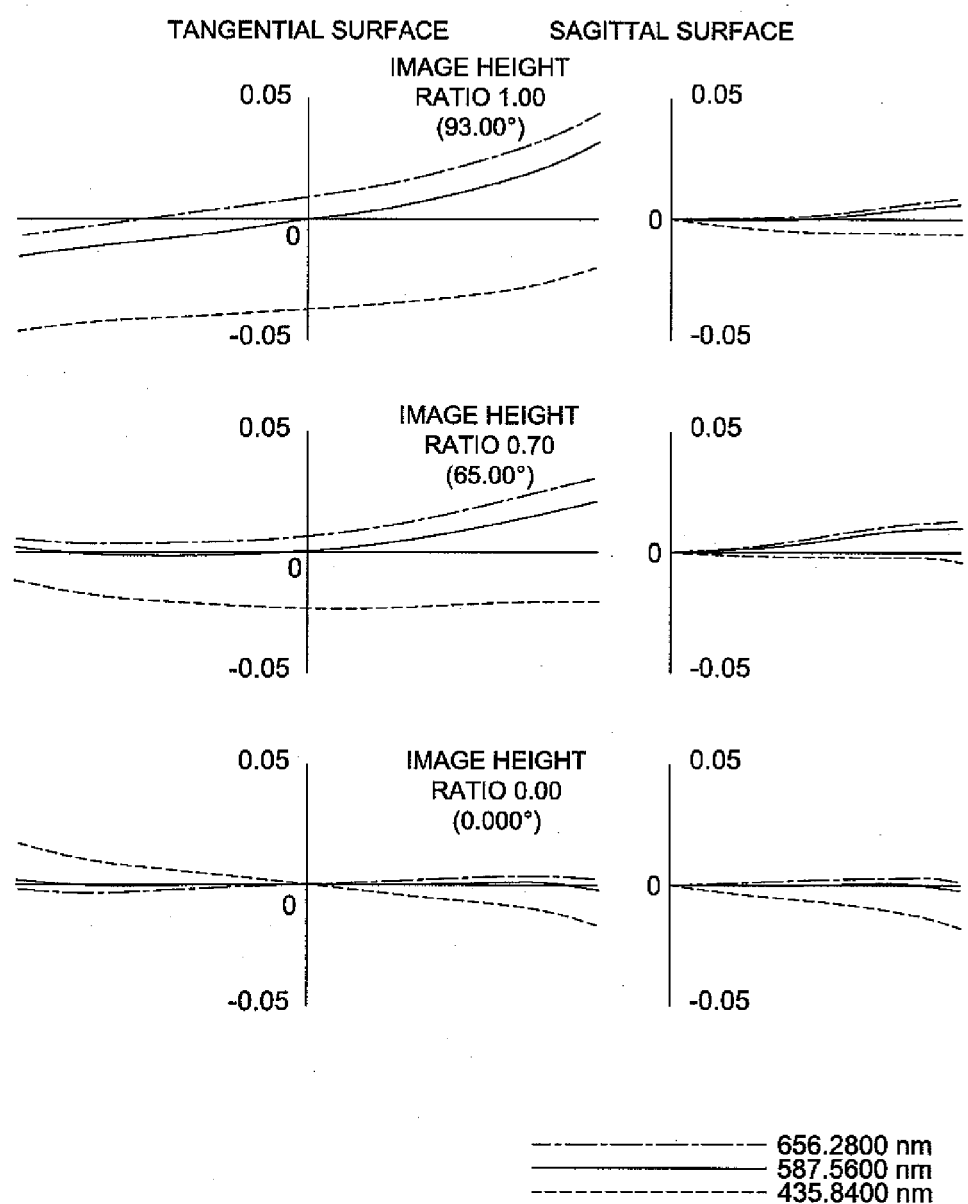

WIDE-ANGLE OPTICAL SYSTEM, AND IMAGING DEVICE

FIELD OF THE INVENTION

The present invention relates to a small-sized wide-angle optical system which has a wide angle of view and is suitably used for an image pickup apparatus for monitoring use such as an onboard camera and a surveillance camera. The present invention particularly relates to a wide-angle optical system that is suitable for a super wide-angle optical system that copes a super wide angle such that its total angle of view is 180° or more. Further, the present invention relates to an image pickup apparatus equipped with the aforesaid wide-angle optical system.

DESCRIPTION OF RELATED ART

When image information in surroundings is picked up with a small number of cameras, wide-angle optical systems having a large angle of view for taking images (wide angle of view) are employed in general. For example, such the wide-angle optical system has been used for a purpose of a surveillance system and onboard system.

Such the wide-angle optical systems are disclosed in Patent Literature 1 through Patent Literature 3, for example. The wide-angle optical system disclosed in Patent Literature 1 can prevent so-called shading that can be a problem when the optical system has a super wide angle and is formed of a small number of lenses that is about four or five lenses. The wide-angle optical system disclosed in Patent Literature 2 achieves a super wide angle by being formed of a small number of lenses that is four lenses. The wide-angle optical system disclosed in Patent Literature 3 achieves relatively excellent optical property by employing six lenses.

CITATION LIST

Patent Literature

Patent Literature 1: JP-A No. 2005-227426
Patent Literature 2: JP-A No. 2006-259704
Patent Literature 3: JP-A No. 2007-249073

TECHNICAL PROBLEM

Incidentally, small-sized optical systems which have higher resolution and are smaller in size have been required for onboard use and surveillance use, recently. Especially, an onboard camera for monitoring rear view of a vehicle, for example, has been required to be more compact in addition to have a wide angle of view, from a viewpoint of a practical use not to block the visibility of a driver and a viewpoint of a beautiful appearance of the vehicle. Further, corresponding to an increase of the number of pixels of an image pickup element optical systems which are downsized and have excellent optical properties with coping with the increase have been required, too.

In the wide-angle optical system disclosed in Patent Literature 1, optical power of each lens, especially optical power of positive lens, became strong corresponding to a decrease of its size. Therefore, manufacturing-error sensitivity became high in both of a coaxial optical system and a decentered optical system, and it led to an increase of cost and deterioration of property of products, which was a problem.

Further, the wide-angle optical system disclosed in Patent Literature 2 had a problem that it was difficult to achieve an optical system coping with the increase of pixels in an image pickup element, because it was formed of the small numbers of lenses.

On the other hand, the wide-angle optical system disclosed in Patent Literature 2 achieved relatively excellent optical properties by using six lenses, but it had a problem in downsizing of the optical system because the number of lenses is as many as six.

SUMMARY OF THE INVENTION

The present invention has been achieved in view of the aforesaid circumstances, and its object is to provide a small-sized wide-angle optical system which has more excellent optical property and has a super wide angle of view such that its total angle of view is 180° or more.

SOLUTION TO PROBLEM

For solving the aforesaid technical problems, the present invention provides a wide-angle optical system and an image pickup apparatus, each having the following structures. Incidentally, technical terms used in the following explanations are defined as follows in the present description.

(a) A refractive index is defined as a refractive index at the wavelength of d line (587.56 nm).

(b) The Abbe number νd is obtained by the definitional equation:

$$\nu d = (nd-1)/(nF-nC),$$

where nd, nF and nC represent respectively refractive indexes at d line, F line (486.13 nm) and C line (656.28 nm).

(c) A surface shape is expressed based on a paraxial curvature. Accordingly, when the expressions of "concave", "convex" and "meniscus" are used for lenses, they are defined to express lens forms in the vicinity of the optical axis (vicinity of the center of a lens).

(d) A resin material used for a compound aspheric lens is not handled as an independent optical member, because it has only additional function to a glass material for a substrate. The resin material is handled in the same way as in the case where the glass material for the substrate is formed to have an aspheric surface, and is handled as one lens together with the substrate. As for the refractive index of the lens, a refractive index of the glass material forming the substrate is considered as the refractive index of the lens. The compound aspheric lens is a lens which is formed into an aspheric surface with a thin resin material applied on a glass material forming a substrate.

A wide-angle optical system relating to the present invention is characterized by comprising, in order from an object side to an image side: a front group; a stop; and a rear group, wherein the front group comprises, in order from the object side to the image side, a first lens having a negative optical power, a second lens having a negative optical power, and a third lens having a positive optical power, the rear group comprises, in order from the object side to the image side, a fourth lens having a positive optical power, and a fifth lens having a negative optical power, and an opposite surface from the aperture of each of a pair of lenses which are arranged at the both sides of the stop is a convex surface.

A wide-angle optical system having such the structure, achieves a wide angle of view, especially a super wide angle of view and achieves downsizing of the optical system with keeping more excellent optical properties, because the first through fifth lenses are arranged in the above order. Further, because there are arranged two negative lenses and one positive lens in order from the object side to the image side, optical power of negative lenses is distributed properly and an incident angle of an off-axis ray entering the image plane can be controlled to be small. Further, chromatic aberrations are corrected effectively, because one positive lens and one negative lens are arranged at closer positions to the image side than the stop.

In the above wide-angle optical system, it is preferable that the following conditional expression (1) is satisfied.

$$Rfs/Rrs<0 \qquad (1)$$

In the expression, Rfs is a curvature radius of an object-side surface of a lens which is arranged at the object side of the stop and is closest to the stop, and Rrs is a curvature radius of an image-side surface of a lens which is arranged at the image side of the stop and is closest to the stop.

When the value of the conditional expression (1) becomes larger than the upper limit in the structure, lens surfaces which are arranged to be close to each other and are arranged at the both sides of the stop become asymmetric with respect to the stop, which results in easy generation of various aberrations. Therefore, it is difficult to correct aberrations in an excellent condition, which is not preferable.

Further, in the above wide-angle optical system, it is preferable that the following conditional expression (2) is satisfied.

$$1<Ffs/Frs<4 \qquad (2).$$

In the expression, Ffs is a focal length of a lens which is arranged at the object side of the stop and is closest to the stop and Frs is a focal length of a lens which is arranged at the image side of the stop and is closest to the stop.

When the value of the conditional expression (2) becomes larger than the upper limit in the structure, the optical-power ratio of lenses which are arranged at the both sides of the stop becomes great, which allows various aberrations to be easily generated. Thereby, burden of the other lenses in terms of aberration correction increase, which is disadvantageous for downsizing of the optical system and enhancement of properties and is not preferable. When the value of the conditional expression (2) becomes smaller than the lower limit in the structure, the power arrangement of lenses which are arranged at the both sides of the stop is restricted, which reduces the degree of freedom of correcting various aberrations and is disadvantageous for enhancement the optical system, too.

Further, in the above wide-angle optical system, it is preferable that the following conditional expression (3) is satisfied.

$$1.7<vd4/vd3<2.7 \qquad (3)$$

In the expression, vd3 is an Abbe number of the third lens and vd4 is an Abbe number of the fourth lens.

In the structure deviates from the range of the conditional expression (3), a balance of Abbe numbers of a pair of lenses arranged at the both side of the stop, which is not preferable.

Further, in the above wide-angle optical system, it is preferable that the following conditional expression (4) is satisfied.

$$3>vd4/vd5>1.5 \qquad (4)$$

In the expression, vd4 is an Abbe number of the fourth lens and vd5 is an Abbe number of the fifth lens.

The structure is prepared to make the difference in the Abbe number between the fourth lens and the fifth lens greater, which enables a chromatic aberration to be corrected properly and effectively. Further, when the value of the conditional expression (4) becomes smaller than the lower limit in the structure, the balance between the Abbe numbers of the fourth lens and the fifth lens breaks down, which makes excellent correction of a chromatic aberration difficult and is not preferable. When the value of the conditional expression (4) becomes larger than the upper limit in the structure, a longitudinal chromatic aberration is excessively corrected and becomes hard to be properly corrected.

The optical system achieves the super wide angle by using strong negative power of the first and second lenses, but is preferable to further a correct chromatic abandon of magnification. By satisfying the conditional expression (3) to balance the Abbe numbers of the third lens and the fourth lens, the structure corrects the chromatic aberrations. In other words, the structure corrects the longitudinal chromatic aberration with the Abbe number of the third lens, and corrects the chromatic aberration of magnification with the Abbe number of the fourth lens. Further, it is preferable that the structure satisfies the conditional expression (4) to balance the Abbe numbers of the fourth lens and fifth lens, and the longitudinal aberration can be furthermore corrected with the Abbe number of the fifth lens.

In the above wide-angle optical systems, it is preferable that each of the second through fifth lenses comprises at least one aspheric surface.

The structure exhibits the effect, by providing at least one aspheric surface to each of the second though fifth lenses, for reducing various aberrations and shortening the total length of the optical system.

In the above wide-angle optical systems, it is preferable that the following conditional expression (5) is satisfied.

$$Ff/Fr>0 \qquad (5)$$

In the expression, Ff is a focal length of the front group and Fr is a focal length of the rear group.

When the value of the conditional expression (5) becomes smaller than the loser limit in the structure, the structure becomes so-called a retro-focus system and its back focal length is elongated. Therefore, it makes difficult to downsize the optical system, which is not preferable.

In the above wide-angle optical systems, it is preferable that the following conditional expression (6) is satisfied.

$$-1.5>F3/F12>-2.8 \qquad (6)$$

In the expression, F3 is a focal length of the third lens and F12 is a composite focal length of the first lens and the second lens.

When the value of the conditional expression (6) becomes smaller than the lower limit in the structure, the positive optical power owned by the third lens becomes relatively weaker than the negative optical power each owned by the first and second lenses. It makes difficult to downsize the optical system, which is not preferable. When the value of the conditional expression (6) becomes larger than the upper limit in the structure, the positive optical power owned by the third lens becomes relatively stronger than the negative optical power each owned by the first and second lenses, and decentration sensitivity becomes higher. Thereby, difficulty in manufacturing rises, which leads to a deterioration of its productivity and increase of its cost.

In the above wide-angle optical systems, it is preferable that the following conditional expression (7) is satisfied, $$-2<F5/F4<-1 \qquad (7)$$

In the expression, F4 is a focal length of the fourth lens and F5 is a focal length of the fifth lens.

The structure exhibits an effect to control a deterioration of peripheral illuminance to be the minimum, by constructing the rear group by the fourth lens with negative optical power and the fifth lens with positive optical power. When the value of the conditional expression (7) becomes larger than the upper limit in the structure, the optical power of the fourth lens becomes relatively weaker than the optical power of the fifth lens. It makes difficult to shorten the total length of the optical system, which is not preferable. When the value of the conditional expression (7) becomes smaller than the lower limit in the structure, the optical power of the fifth lens becomes great, which increases the incident angle of a peripheral light flux at the image-plane portion, and leads to the deterioration of the peripheral illuminance.

In the above wide-angle optical systems, the first lens is preferably a lens made of a glass material.

The structure enables to secure the reliability of its solidness, chemical resistance, and water resistance, by constructing the first lens of a lens formed of a glass material. On the other hand, it exhibits an effect for spherical aberration, coma, and astigmatism by constructing the second lens by a lens formed of a plastic material. Further, by constructing each of the other lenses of a lens formed of a resin material, and applying the aspheric surfaces to each of the lenses formed of a resin material, for example, it is possible to obtain a lens with high performance at a low cost.

In the above wide-angle optical systems, the second lens is preferably a lens made of a resin material and comprising at least one aspheric surface.

The structure can correct a spherical aberration, coma, and astigmatism effectively by arranging an aspheric surface on the second lens, which enables to obtain a lens with a high performance at a low cost.

In the above wide-angle optical systems, the third lens is preferably a lens made of a resin material and comprising at least one aspheric surface.

The structure exhibits an effect to correct a spherical aberration, coma, and astigmatism effectively by arranging an aspheric surface on the third lens. By arranging the aspheric surface on the lens formed of a resin material, a lens with a high performance can be obtained at a low cost.

In the above wide-angle optical systems, the fourth lens is preferably a lens made of a resin material and comprising at least one aspheric surface.

The structure exhibits an effect to correct a spherical aberration, coma, and astigmatism effectively by arranging an aspheric surface on the fourth lens. By arranging the aspheric surface on the lens formed of a resin material, a lens with a high performance can be obtained at a low cost.

In the above wide-angle optical systems, the fifth lens is a lens made of a resin material and comprising at least one aspheric surface.

The structure exhibits an effect to correct a distortion, spherical aberration, coma, and astigmatism effectively by arranging an aspheric surface on the fifth lens. By arranging the aspheric surface on the lens formed of a resin material, a lens with a high performance can be obtained at a low cost.

An image pickup apparatus relating to an embodiment of the present invention is characterized by comprising: any one of the above wide-angle optical systems; and an image pickup element for picking up an optical image of a subject formed by the wide-angle optical system.

According to the above structure, an image pickup apparatus equipped with a relatively wide-angle optical system can be provided.

In the above image pickup apparatus, it is preferable to comprise an image processing section for processing an output of the image pickup element with a predetermined image processing. Further, in the above image pickup apparatus, it is preferable that the predetermined image processing includes a distortion-correcting processing which corrects a distortion in the optical image of the subject formed on a light-receiving surface of the image pickup element.

A wide-angle optical system generates distortion which is relatively larger than that of an ordinal optical system (which is a non-wide-angle optical system). According to the structure, by correcting the distortion with an image processing, the image pickup apparatus can be applied to a relatively wide use such as an onboard use and surveillance use, and an useful image inputting device (for example, a camera) can be provided.

ADVANTAGEOUS EFFECTS OF INVENTION

According to the present invention, there can be provided a compact wide-angle optical system having more excellent optical properties and super wide angle of view. Further, the present invention provides an image pickup apparatus equipped with such the wide-angle optical system.

BRIEF DESCRIPTION OF THE DRAWINGS

FIG. 3A and 3B are external block diagrams of a cellphone equipped with a camera, showing an embodiment of a digital apparatus;

FIG. 4 is a diagram for explaining an outline of an onboard monitor camera, showing an embodiment of a digital apparatus;

FIGS. 29A, 29B, 29C and 30 show aberration diagrams of lens groups in a wide-angle optical system in Example 8;

FIGS. 31A, 31B, and 32 show aberration diagrams of lens groups in a wide-angle optical system in Example 9; and FIGS. 33A, 33B, 33C and 34 show aberration diagrams of lens groups in a wide-angle optical system in Example 10.

DESCRIPTION OF THE EXEMPLARY EMBODIMENTS

Figure 1:
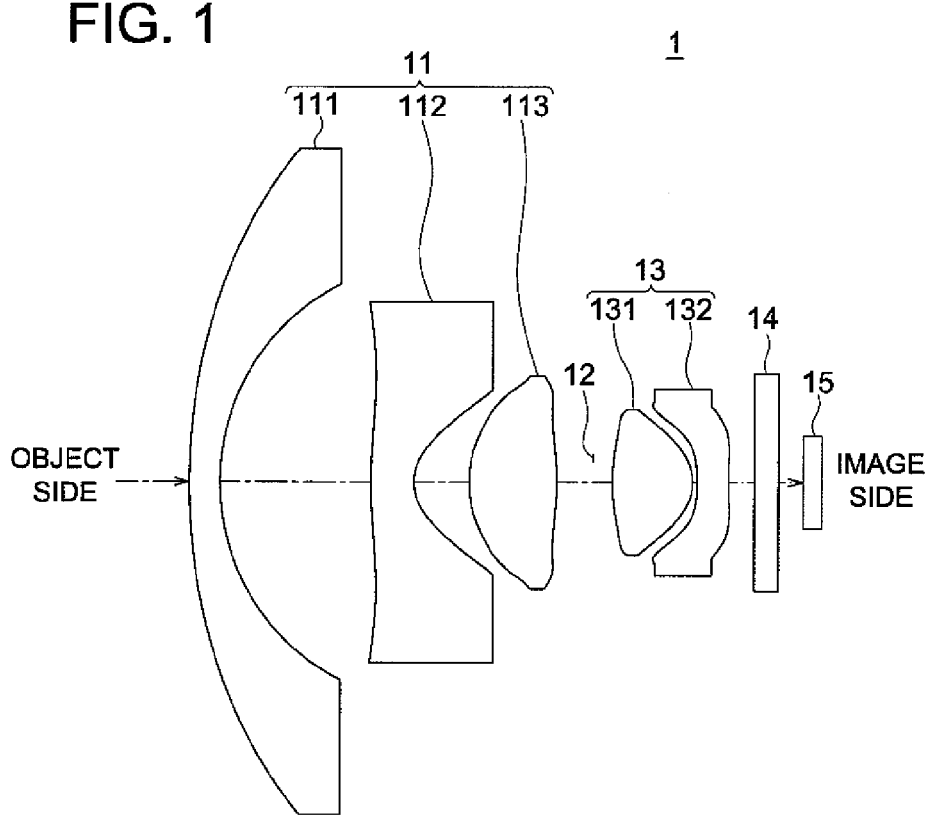
FIG. 1 is a sectional view of lenses for the explanation of a wide-angle optical system in an embodiment, showing the schematic structure.

An embodiment relating to the present invention will be described as follows, referring to the drawings. Meanwhile, items each having the same sign in respective drawings are of the same items, and explanations for them are omitted accordingly.

<Description of Wide-Angle Optical System>

FIG. 1 is a sectional view for the explanation of a wide-angle optical system in an embodiment, and shows a schematic structure.

Wide-angle optical system 1 in FIG. 1, is equipped favorably on an image pickup apparatus whose structure is capable of forming an optical image of an object (photographic subject) on a predetermined image forming surface, for example, on a light-receiving surface (image plane) of image pickup element 15 that converts an optical image into electric signal. Wide-angle optical system 1 is composed of front group 11, stop 12, and rear group 13 which in this order from the object side to the image side. The front group 11 is an optical system with three elements of negative, negative, and positive powers, comprising first lens 111 having negative optical power, second lens 112 having negative optical power, and third lens 113 having positive power, in this order from the object side to the image side. The rear group 13 is an optical system with two elements of positive and negative powers, comprising fourth lens 131 having positive optical power and fifth lens 132 having negative optical power, in this order from the object side to the image side. An opposite surface from the stop 12 of each of a pair of lenses arranged at the both sides of the stop 12, is a convex surface. In the example shown in FIG. 1, a pair of the third lens 113 and the fourth lens 131 are arranged at the both side of stop 12, and the object-side surface of the third lens 113 and the image-side surface of the fourth lens 131, each of which is the opposite surface from the stop 12, are concave surfaces. Incidentally, the structure of wide-angle optical system 1 exemplified in FIG. 1 is the same as that of wide-angle optical system 1A (FIG. 5) in Example 1 which will be described later.

In FIG. 1, each of the first and second lenses 111 and 112 is a negative meniscus lens whose convex surface faces the object side, and the third lens 113 is a biconvex positive lens. The stop 12 is an aperture stop. The fourth lens 131 is a bi-convex positive lens and the fifth lens 132 is a negative bi-concave lens. The first lens 111 is a lens formed of a glass material such as an optical glass. Each of the second through fifth lenses 112, 113, 131, and 132 has opposing surfaces which are aspheric surfaces, and is a lens made of a resin material such as plastic.

In such the wide-angle optical system 1 shown in FIG. 1, because the first through fifth lenses 111, 112, 113, 131, and 132 are arranged in this order, a wide angle of view that is a total angle of view of 90 degrees or more, especially a super wide angle of view that is a total angle of view of 200 degrees or more, is achieved and a downsizing of the wide-angle optical system 1 is also achieved while more excellent optical properties are maintained. Further, because two negative lenses that are the first and second lenses 111 and 112, and one positive lens that is the third lens 113 are arranged in this order from the object side to the image side, optical power of negative lenses is properly distributed and the incident angle of an off-axis ray entering the image plane can be controlled to be small. By arranging one positive lens that is the third lens 113 and one negative lens that is the fourth lens 131 at the image side of the stop 12, chromatic aberrations can be corrected property.

Such the wide angle optical system 1, can cope with the increased number of pixels of image pickup element 15, and there can be provided a compact wide-angle optical system having more excellent optical properties and a super wide-angle of view.

In addition, on the image side of the wide-angle optical system 1, there are arranged filter 14 and image pickup element 15. The filter 14 is an optical element in a shape of parallel flat plate, and indicates various types of optical filters and a cover glass of an image pickup element schematically. An arbitral optical filter such as a lowpass filter and an infrared blocking filter can be arranged, depending on its purpose, a type of image pickup element, and a camera construction. The image pickup element 15 is an element that photo-electrically converts an optical image of a photographic subject formed by wide-angle optical system 1 into image signal with each of components of R (red), G (green) and B (blue), corresponding to the light amount in the optical image, and that outputs the signal to the predetermined image processing circuit (which is not shown in FIG. 1). Owing to the foregoing, the optical image of a photographic subject at the object side are guided to a light-receiving surface of image pickup element 15 by wide-angle optical system 1 along the optical axis AX, and the optical image of the photographic subject is picked up by image pickup element 15. Accordingly, there is provided an image pickup apparatus equipped with such the wide-angle optical system 1, in the present embodiment.

In the wide-angle optical system 1, each of the second through fifth lenses 112, 113, 131, and 132 includes at least one aspheric surface. Therefore, in the wide-angle optical system 1, the total length of the optical system can be shortened with various aberrations being reduced effectively.

In the wide-angle optical system 1, surfaces touching with the air of all lenses excluding the first lens 111 arranged at the closest position to the object side, are aspheric surfaces. In the example shown in FIG. 1, each of the second through fifth lenses 112, 113, 131, and 132 has the opposing surfaces being aspheric surfaces. Accordingly, the wide-angle optical system 1 can be intended for achieving compatibility of the downsizing the wide-angle optical system 1 and the increase of the number of pixels.

In the wide-angle optical system 1, the first lens 111 is a lens made of a glass material. Therefore, the wide-angle optical system 1 can maintain its reliability in terms of solidness, chemical resistance, and water resistance. Especially in the onboard use, the forefront lens surface of the wide-angle optical system 1 is often exposed, and solidness, chemical resistance, and water resistance are required. Therefore, the wide-angle optical system 1 is advantageous in the points of solidness, chemical resistance, and water resistance.

Further, in the wide-angle optical system 1, the second lens 112 is a lens made of resin material and including at least one aspheric surface. In the example shown in FIG. 1, the second lens 112 has the opposing surfaces being aspheric surfaces. Therefore, in the wide-angle optical system 1, spherical aberration, coma, and astigmatism can be corrected effectively, and a lens with high performances can be obtained at a low cost.

Further, in the wide-angle optical system 1, the third lens 113 is a lens made of resin material and including at least one aspheric surface. In the example shown in FIG. 1, the third lens 113 has the opposing surfaces being aspheric surfaces. Therefore, in the wide-angle optical system 1, spherical aberration, coma, and astigmatism can be corrected effectively. Further, by arranging the above aspheric surfaces on the lens made of a resin material, a lens with high performances can be obtained at a low cost.

Further, in the wide-angle optical system 1, the fourth lens 131 is a lens made of resin material and including at least one aspheric surface. In the example shown in FIG. 1, the fourth lens 131 has the opposing surfaces being aspheric surfaces. Therefore, in the wide-angle optical system 1, spherical aberration, coma, and astigmatism can be corrected effectively. Further, by arranging the above aspheric surfaces on the lens made of a resin material, a lens with high performances can be obtained at a low cost.

Further, in the wide-angle optical system 1, the fifth lens 132 is a lens made of resin material and including at least one aspheric surface. In the example shown in FIG. 1, the fifth lens 132 has the opposing surfaces being aspheric surfaces. Therefore, in the wide-angle optical system 1, distortion, spherical aberration, coma, and astigmatism can be corrected effectively. Further, by arranging the above aspheric surfaces on the lens made of a resin material, a lens with high performances can be obtained at a low cost.

Further, in the wide-angle optical system 1, the following conditional expression (1) is preferably satisfied, where Rfs is a curvature radius of an object-side surface of a lens (the third lens 113 in the example shown in FIG. 1) which is arranged at the object side of the stop 12 and is closest to the stop 12, and Rrs is a curvature radius of an image-side surface of a lens (the fourth lens 131 in the example shown in FIG. 1) which is arranged at the image side of the stop 12 and is closest to the stop 12.

$$Rfs/Rrs<0 \quad (1)$$

In the structure, when the value of the conditional expression (1) becomes larger than the upper limit, the lens surfaces arranged to be close to each other at the both sides of the stop 12 are asymmetric, which easily generates various aberrations. Therefore, it is hard to correct the aberrations to be excellent, which is not preferable. Accordingly, aberrations can be corrected to be excellent by using the structure.

In the wide-angle optical system 1, the following conditional expression (2) is preferably satisfied, where Ffs is a focal length of a lens (the third lens 113 in the example shown in FIG. 1) which is arranged at the object side of the stop 12 and is closest to the stop 12 and Frs is a focal length of a lens (the fourth lens 131 in the example shown in FIG. 1) which is arranged at the image side of the stop 12 and is closest to the stop 12.

$$1<Ffs/Frs<4 \quad (2)$$

In the structure, when the value of the conditional expression (2) becomes larger than the upper limit, the ratio of optical power of the pair of lenses (the third lens 113 and the fourth lens 131 in the example shown in FIG. 1) arranged at the both side of the stop 12 becomes great, thereby, the various aberration can be generated easily. It enlarges the burden of the other lens in terms of aberration correction and it is disadvantageous for downsizing of the optical system and for enhancement of the properties, which is not preferable. When the value of the conditional expression (2) becomes smaller than the lower limit, the optical-power arrangement in terms of the pair of lenses (the third lens 113 and the fourth lens 131 in the example shown in FIG. 1) arranged at the both side of the stop 12 is restricted and the degree of freedom for correcting the various aberrations is reduced, which becomes disadvantageous for the enhancement of the properties, too. Therefore, the structure can be intended to downsize of the optical system 1 and to enhance its properties.

In the wide-angle optical system 1, the following conditional expression (2') is more preferably satisfied.

$$1<Ffs/Frs<2.5 \quad (2')$$

In the structure, when the value of the conditional expression (2') becomes smaller than the upper limit, the ratio of optical power becomes small, thereby, the various aberrations are controlled. It is advantageous for downsizing the optical system and for enhancement of the properties. Therefore, the structure can be intended to further downsize of the optical system 1 and to further enhance its properties.

In the wide-angle optical system 1, the following conditional expression (3) is preferably satisfied, where vd3 is an Abbe number of the third lens 131 and vd4 is an Abbe number of the fourth lens 132.

$$1.7<vd4/vd3<2.7 \quad (3),$$

When the structure deviates from the range of the conditional expression (3), the balance of Abbe numbers of the pair of lenses arrange at the both sides of the stop 12 is broken and it is hard to correct chromatic aberrations, which is not preferable. Therefore, the structure enables to correct the chromatic aberration to be excellent.

In the present invention, by arranging two negative lenses to be started from the object side, rays with the large angle of view are converged to achieve a super wide angle that the total angle of view is 180 degrees or more. The chromatic aberration of magnification generated in the two negative lenses is preferably corrected. To correct the chromatic aberration of magnification, it is required to reduce the Abbe number of the third lens with a positive power. Further, to correct the longitudinal chromatic aberration in an excellent condition, it is required to set the Abbe number of the fourth lens with positive power properly.

In the wide-angle optical system 1, the following conditional expression (4) is preferably satisfied, where d4 is an Abbe number of the fourth lens 131 and vd5 is an Abbe number of the fifth lens 132.

$$3>vd4/vd5>1.5 \quad (4)$$

In the structure, the fourth lens 131 and the fifth lens 132 are configured to have Abbe numbers which greatly differ from each other, therefore, the chromatic aberrations can be corrected in an excellent condition. When the value of the conditional expression (4) becomes smaller than the lower limit, the balance of the Abbe numbers of the fourth lens 131 and the fifth lens 132 are broken and it becomes difficult to correct the chromatic aberrations to be an excellent condition, which is not preferable. When the value of the conditional expression (4) becomes larger than the upper limit, the longitudinal chromatic aberration is excessively corrected and it becomes difficult to correct the chromatic aberration to be an excellent condition.

In the wide-angle optical system 1, the following conditional expression (5) is preferably satisfied, where Ff is a focal length of the front group 11 and Fr is a focal length of the rear group 12.

$$Ff/Fr>0 \quad (5)$$

When the value of the conditional expression (5) becomes smaller than the lower limit, the structure becomes so-called a retro-focus system, thereby, its back focal length is elongated, which is not preferable. Therefore, the structure can be intended to downsize the wide-angle optical system 1.

In the wide-angle optical system 1, the following conditional expression (6) is preferably satisfied, where F3 is a focal length of the third lens 113 and F12 is a composite focal length of the first lens 111 and the second lens 121.

$$-1.5 > F3/F12 > -2.8 \quad (6)$$

When the value of the conditional expression (6) becomes smaller than the lower limit, the positive optical power owned by the third lens is relatively weaker than the negative optical power owned by each of the first and second lenses 111 and 112. It makes difficult to downsize the optical system, which is not preferable. Accordingly, the structure can be intended to downsize the wide-angle optical system. When the value of the conditional expression (6) becomes larger than the upper limit, the positive optical power owned by the third lens is relatively stronger than the negative optical power owned by each of the first and second lenses 111 and 112. It increases the decentration sensitivity. Thereby, the difficulty of manufacturing rises, which leads to a deterioration of productivity and an increase of cost.

In the wide-angle optical system 1, the following conditional expression (6') is more preferably satisfied.

$$-1.5 > F3/F12 > -2.5 \quad (6')$$

When the value of the conditional expression (6') becomes smaller than the lower limit, the positive optical power owned by the third lens is relatively weaker than the negative optical power owned by each of the first and second lenses 111 and 112. It reduces the optical power to converge the light flux deflected by the negative lenses being the first and second lenses 111 and 112 by using the third lens 113 with positive power. It makes difficult to downsize the optical system, which is not preferable. Accordingly, the structure can be intended to downsize the wide-angle optical system.

In the wide-angle optical system 1, the following conditional expression (7) is preferably satisfied, where F4 is a focal length of the fourth lens and F5 is a focal length of the fifth lens.

$$-2 < F5/F4 < -1 \quad (7)$$

In this structure, the rear group 13 is constructed by the fourth lens 131 having negative optical power and the fifth lens 132 having positive optical power, which exhibits an effect to reduce peripheral illuminance to the minimum. When the value of the conditional expression (7) becomes larger than the upper limit, the balance of Abbe numbers of the fourth lens 131 and fifth lens 132 is broken, and it makes difficult to correct chromatic aberrations, which is not preferable. Accordingly, the structure can be intended to downsize the wide-angle optical system. When the value of the conditional expression (6) becomes smaller than the lower limit, the power of the fifth lens becomes strong and an incident angle of a peripheral ray entering the image plane section, which leads to a deterioration of a peripheral illuminance.

In the wide-angle optical system 1, a glass lens including an aspheric surface may be a molded aspherical glass lens, a grinded aspherical glass lens, or a complex aspherical lens (which is provided by forming resin in an aspheric surface shape on a spherical glass lens). Molded aspherical glass lenses are suitable to mass production and are preferable. As for complex aspherical lenses, there exist many glass materials to be a substrate, and it increase the degree of freedom of the lens design. The complex aspherical lenses are preferable, because molding processing especially for aspherical lenses using a high-refractive-index material is not easy. When an aspheric surface is provided only for one side, the advantage of the complex aspherical lens can be utilized at the maximum.

Further, it is preferable that the lens arranged at the closest position to the object side (the first lens 111 in FIG. 1) is a lens made of a glass material and satisfying the following conditional expression (8), where DA1 represents a value of acid resistance which is obtained by putting powder of a glass material of the lens arranged at the closest position into nitric acid solution with a concentration of 0.01 mol/l, heating the nitric acid solution in a boiling bath, and measuring a reduced mass (%) of the power of the glass material as the value representing acid-resistance.

$$DA1 < 0.35 \quad (8)$$

When a value of the conditional expression (8) exceeds the upper limit, chemical reaction such as so-called the tarnish is caused in lenses under the situation that the lens at the closest position to the object side in an uncovered condition is exposed in an outside environment, and the optical property of wide-angle optical system 1 is deteriorated, which is not preferable. However, since the lens arranged the closest position to the object side satisfies the conditional expression (8), it is possible to control the deterioration of the optical property. In this case, this numerical value and its measurement methods are based on the description of the optical glass catalog of HOYA CORPORATION or on the description of the optical glass catalog of SUMITA Optical glass, Inc.

In wide-angle optical system 1, it is preferable that the lens arranged at the closest position to the object (the first lens 111 in FIG. 1), satisfies any one of the following conditional expressions (9) and (10), or satisfies both of them, where Hk1 represents Knoop hardness, and DS1 is a value obtained as follows. There is prepared a glass member which is 43.7 mm in diameter (30 cm$^2$ in the area of the opposing surfaces), and is 5 mm in thickness. The opposing surfaces of the glass member are polished. There is further prepared solution of pentasodium triphosphate ($Na_5P_3O_{10}$) which is 0.01 mol/l in concentration, is 50° C. in temperature, and is stirred up sufficiently. The optical member is dipped in the solution for one hour, and a reduced mass (mg/(cm$^2$·h)) of the dipped glass member per unit area is measured as the value of DS1.

$$Hk1 > 350 \quad (9)$$

$$DS1 \leq 0.01 \quad (10)$$

A material that satisfies at least one of the conditional expressions (9) and (10), such as a glass material, is excellent on the points of solidness, chemical proof and water proof property. Since the first lens 11 arranged at the closest position to the object is formed of such the material, it is excellent on the points of solidness, chemical resistance and water resistance property, even when, for example, a lens protective member is not arranged in front of the wide-angle optical system 1 and the lens closest to the object side is in an uncovered condition. It controls the deterioration of the image pickup property, which is preferable. In particular, the forefront surface is exposed in many optical systems for the onboard application, and the glass material is suitable to such the application <Digital Apparatus Equipped with a Wide-Angle Optical System>

Next, a digital apparatus equipped with the aforesaid wide-angle optical system 1 will be explained.

Figure 2:
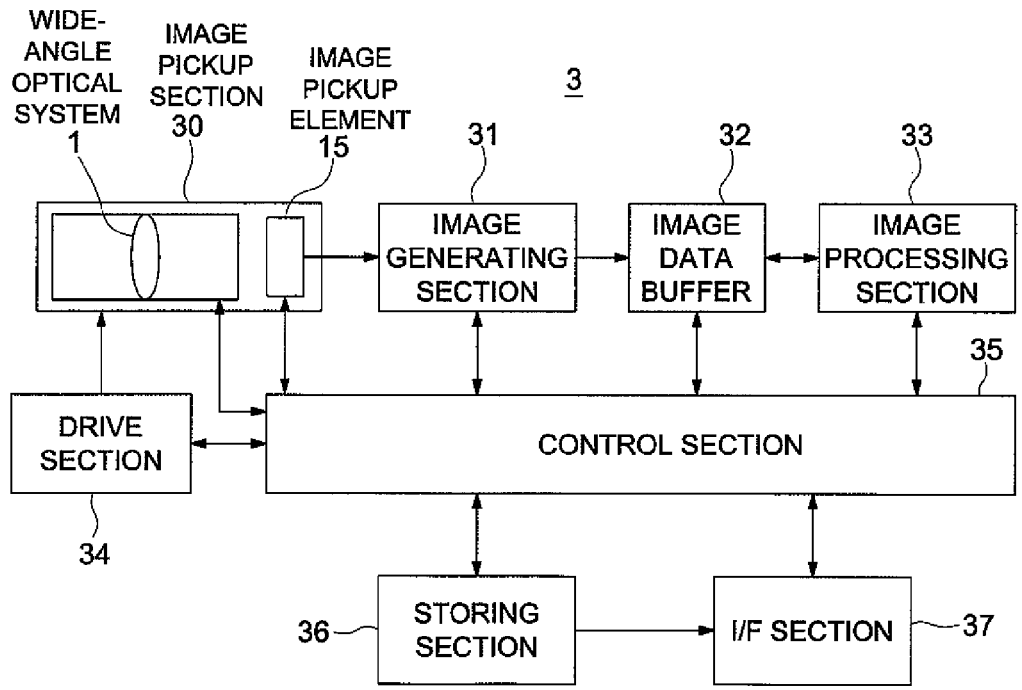
FIG. 2 is a block diagram showing the structure of a digital apparatus in an embodiment.

FIG. 2 is a block diagram showing a structure of a digital apparatus in the present embodiment. In FIG. 2, digital apparatus 3 is composed of image pickup section 30, image generating section 31, image data buffer 32, image processing section 33, drive section 34, control section 35, storing section 36 and of I/F section 37, for the image pickup functions. As the digital apparatus 3, there are given, for example, a digital still camera; a digital video camera; a monitor camera for a surveillance and onboard purposes; a mobile terminal such as a cell-phone and a mobile information terminal (PDA), a personal computer, and a mobile computer, which may include peripheral devices of these apparatuses (for example, a mouse, a scanner and a printer).

Image pickup section 30 is composed of wide-angle optical system 1 and image pickup element 15. The wide-angle optical system 1 forms an optical image of the photographic subject on image pickup element 15 in the example shown in FIG. 2. A ray from the photographic subject is formed into an image on a light-receiving surface of the image pickup element 15 with the wide-angle optical system 1, and becomes an optical image of the photographic subject.

Image pickup element 15 is an element which converts the optical image of the photographic subject guided by the wide-angle optical system 1 into electric signal. As described above, the image pickup element 15 converts the optical image of the photographic subject formed by the wide-angle optical system 1 into electric signal (image signal) with each of color components of R, G, and B, and outputs the resulting signal to image generating section 31 as image signal of each of colors of R, G, and B. The image pickup element 15 is controlled by control section 35 in terms of image pickup operations such as shooting of a static image or video, and reading (horizontal synchronizing, vertical synchronizing, and transmission) of output signal of each pixel in image pickup element 15. The image pickup element 15 can be a solid-state image pickup element such as CCD and CMOS, and can be a color image pickup element or a monochrome image pickup element.

Image generating section 31 processes analog output signal from image pickup element 15 with an amplification and a digital conversion processing, and processes it with well-known image processing such as a definition of proper black level, γ correction, white balance adjustment (WB adjustment), outline correction, and color shading correction, for the whole area of the image, to generate image data of respective pixels from the image signal. The image data generated by image generating section 31 is outputted to image data buffer 32.

Image data buffer 32 is a memory that is used as a working area on which image data temporarily is stored and a processing which will be described later is applied to the image data, and is structured by RAM (Random Access Memory) representing a volatile storing element, for example.

Image processing section 33 is a circuit that performs image processing such as resolution conversion for the image data in image data buffer 32. The image processing section 33 may also be constructed, as occasion demands, to correct aberrations that has not been corrected sufficiently by wide-angle optical system 1 with well-known distortion correction processing that corrects distortion in an optical image of the photographic subject which is formed on a light-receiving surface of image pickup element 15. The distortion correction makes it possible to correct the image that is deformed by aberrations, for example, distortion, into a distortion-free image which is natural and is in a similar figure that is the same as that in the scene viewed by the naked eye. By providing such the structure, a distortion-free image which is natural can be generated even if there is generated a distortion in an optical image of the photographic subject guided to the image pickup element 15 by the wide-angle optical system 1.

Drive section 34 is a circuit to drive the lens drive device which is not illustrated, based on controlling signal outputted from control section 35, to perform a focusing of wide-angle optical system.

Control section 35 is composed of, for example, a microprocessor, a storing element and their peripheral circuits. The control section 35 controls operations of respective sections including image pickup section 30, image generating section 31, image data buffer 32, image processing section 33, drive section 34, storing section 36 and I/F section 37, depending on their functions. Namely, the control section 35 controls digital apparatus 3 to shoot at least one of a static image of the photographic subject or a movie of the photographic subject.

Storing section 36 is a storing circuit that stores image data generated through shooting static image or movie of the photographic subject and it is composed, for example, of ROM (Read Only Memory) representing a nonvolatile storing element, EEPROM (Electrically Erasable Programmable Read Only Memory) representing nonvolatile storing element capable of rewriting, and RAM. In short the storing section 36 has functions as a memory for a static image and a movie.

I/F section 37 is an interface that transmits and receives image data with outer equipment and for example, it is an interface that is in conformity to standards such as USB and IEEE1394.

Image pickup operations of digital apparatus 3 having such the structure will be described as follows.

When a static image is shot, control section 35 controls respective sections of digital apparatus 3 to shoot a static image, and further drives drive device, which is not illustrated, through drive section 34, to perform the focusing operation. Thereby, optical images on which the focus is adjusted are periodically and repeatedly formed on a light-receiving surface of image pickup element 15, and are converted into image signal with each of color components of R, G, and B, then, the image signal is outputted to image generating section 31. The image signal is stored in image data buffer 32 temporally, and image processing section 33 processes the image signal with image processing, then, an image based on the image signal is displayed on a display (display device) which is not illustrated. Then, a cameraman can adjust the main photographic subject to be placed at the desired position in an image area by viewing the display. When a shutter button is pushed under this state, the image data is stored in storing section 36 as a memory for a static image, and a static image is obtained.

When a movie is shot, controller 35 controls respective sections of digital apparatus 3 to shoot a movie. After the similar processing to shooting the static image, the cameraman can adjust the main photographic subject to be placed at the desired position in the image area by viewing the display. When a shutter button is pushed under this state, similarly to the static image, the shooting operation of a movie starts.

When a move is shot, control section 35 controls to make respective sections of digital apparatus 3 shoot a movie. The control section 35 further drives the image drive device which is not illustrated through drive section 34, to perform the focusing operation. Thereby, optical images on which the focus is adjusted are periodically and repeatedly formed on a light-receiving surface of image pickup element 15, and are converted into image signal with each of color components of R, G, and B, then, the image signal is outputted to image generating section 31. The image signal is stored in image data buffer 32 temporally, and image processing section 33 processes the image signal with image processing, then, the image based on the image signal is displayed on a display which is not illustrated. When a shutter button is pushed again, the shooting of the movie ends. The movie which has been shot is led to storing section 36 to be stored.

Such the digital apparatus 3 can cope with the increased number of pixels of image pickup element 15 and employ wide-angle optical system 1 having an more excellent optical property and super wide angle of view. Therefore, the digital apparatus 3 can employ image pickup element 15 with a large number of pixels while downsizing of the digital apparatus 3 is achieved.

Next, as a concrete example of a digital apparatus equipped with the wide-angle optical system 1, an embodiment that wide-angle optical system 1 is built in a mobile cell-phone and an embodiment that wide-angle optical system 1 is built in an onboard monitor camera will be described below.

FIG. 3 is an external block diagram of a cell-phone equipped with a camera showing an embodiment of a digital apparatus. FIG. 3A shows an operation surface of the cell-phone, and FIG. 3B shows the opposite side of the operation surface that is a back side.

In FIG. 3, antenna 51 is equipped on an upper part of cell-phone 5. On its operation surface, there are provided, as shown in FIG. 3A, rectangular display 52; image shooting button 53 that starts a mode of image shooting and switches shooting of a static image and shooting of a movie; shutter button 55; and dial button 56. In this cell-phone 5, a circuit that realizes telephone functions through a cell-phone network is incorporated. There are further equipped the image pickup section 30, image generating section 31, image data buffer 32, image processing section 33, drive section 34, control section 35, and storing section 36, in the cell-phone 5. The wide-angle optical system 1 in the image pickup section 30 is placed on its back surface.

When the image shooting button 53 is operated, control signal indicating the operation contents are outputted to control section 35, and the control section 35 carries out operations depending on the contents of the operation. Then, when shutter button 55 is operated, the control signal indicating the contents of the operation are outputted to control section 35, thus, the control section 35 carries out operations based on the contents of the operation. In this way, a static image or movie is shot.

Further, wide-angle optical system 1 relating to the present embodiment is attached on the prescribed position, to be preferably built in a monitor camera which takes an image of a photographic subject within a prescribed area surrounding the position where the wide-angle optical system is attached, for example, an onboard monitor camera which takes an image within an area surrounding a vehicle.

FIG. 4 is a diagram for explaining an outline of an onboard monitor camera showing an embodiment of a digital apparatus. In FIG. 4, onboard monitor camera 7 is arranged at a predetermined position at a rear portion of vehicle 9 so as to take an image at a rear portion of vehicle 9, for example. The image of a photographic subject which has been taken is displayed on a monitor which is not illustrated and is placed on a dash-board, for example. Onboard monitor camera 7 is attached on vehicle 9 in a posture to be inclined downward obliquely so that its optical axis AX may point downward obliquely, because a field of view upward vehicle 9 is not generally requested. Then, in the vertical direction, the onboard monitor camera 7 has an angle of view $2\phi$ whose upper end is a horizontal line passing through a position where monitor camera 7 is attached. In the present description, an angle of view in the horizontal direction is also $2\phi$ in the same way as in the vertical direction, but the invention is not limited to this, and an angle of view in the vertical direction may be different from that in the horizontal direction.

A flow of the processing in the case where onboard camera 7 having the aforesaid structure is used as a rear-view monitor, will be explained as follows as an outline. A user (driver) reverses vehicle 7 while observing a monitor (display device), which is not illustrated, installed on a dash board of vehicle 9, for example. When an area where the driver desires to observe is displaced from an area taken by onboard camera 7, the driver conducts prescribed operations such as operations of buttons provided on a dashboard, which is not illustrated.

Receiving the operations, control section 35 controls drive section 34 and adjusts a direction of image pickup section 30. After that, control section 35 drives the aforesaid lens drive device of the image pickup section 30, to adjust the focus of wide-angle optical system 1. Owing to this, an optical image on which the focus is adjusted is formed on a light-receiving surface of image pickup element 15, and is converted in image signal with each of color components of R, G, and B, then, the image signal is outputted to image generating section 31. The image signal is stored temporarily in image data buffer 32, and image processing section 33 processes it with an image processing. Accordingly, an image which is almost natural and is placed within an area where the driver desires to observe, is displayed on the monitor installed on the dash board.

<Description of Specific Embodiment of Wide-Angle Optical System>

Specific constructions of wide-angle optical system 1 shown in FIG. 1, namely, of wide-angle optical system 1 equipped on image pickup apparatus 21 to be built in digital apparatus 3 shown in FIG. 3 will be explained as follows, referring to drawings.

EXAMPLES

Example 1

Figure 5:
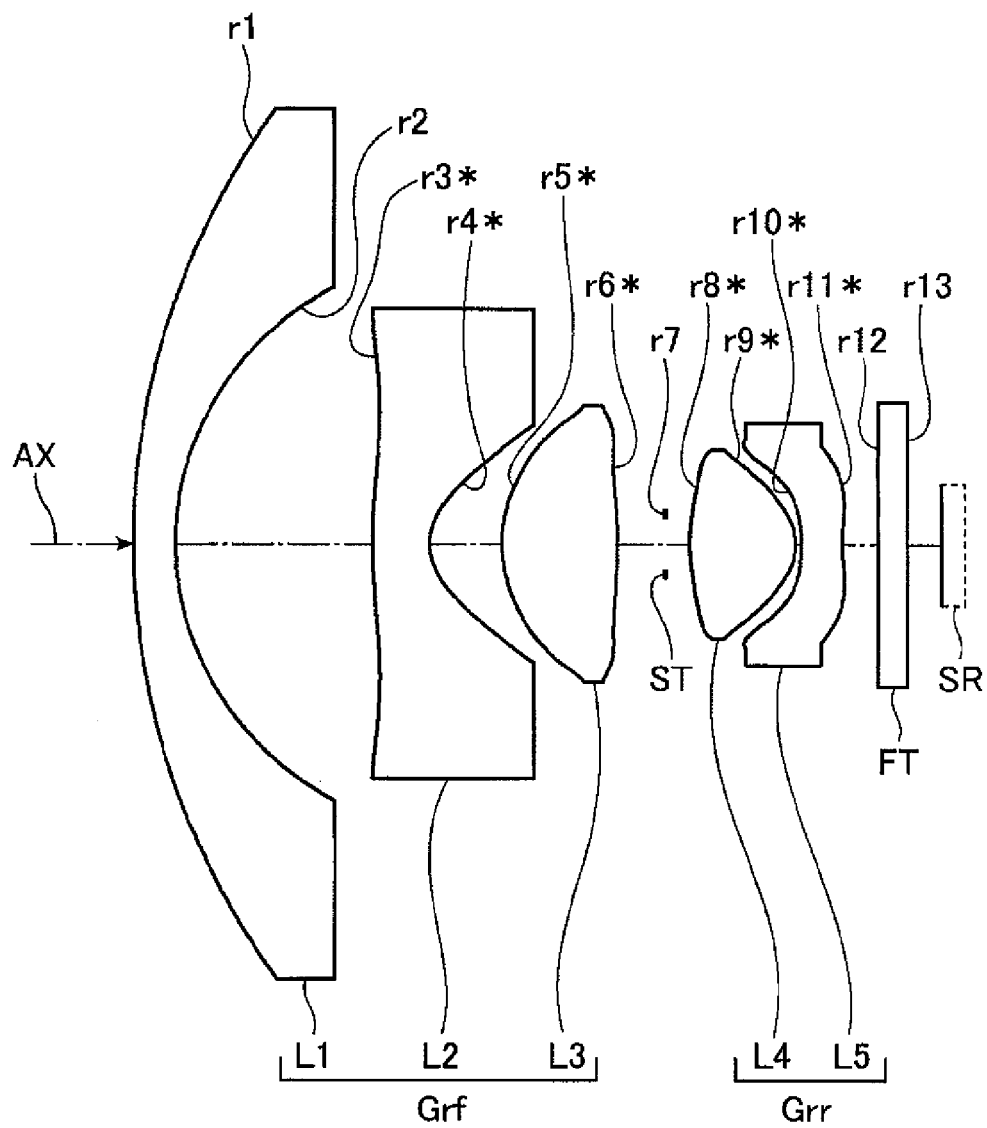
FIG. 5 is a sectional view showing an arrangement of lens groups in a wide-angle optical system of Example 1.
Figure 15:
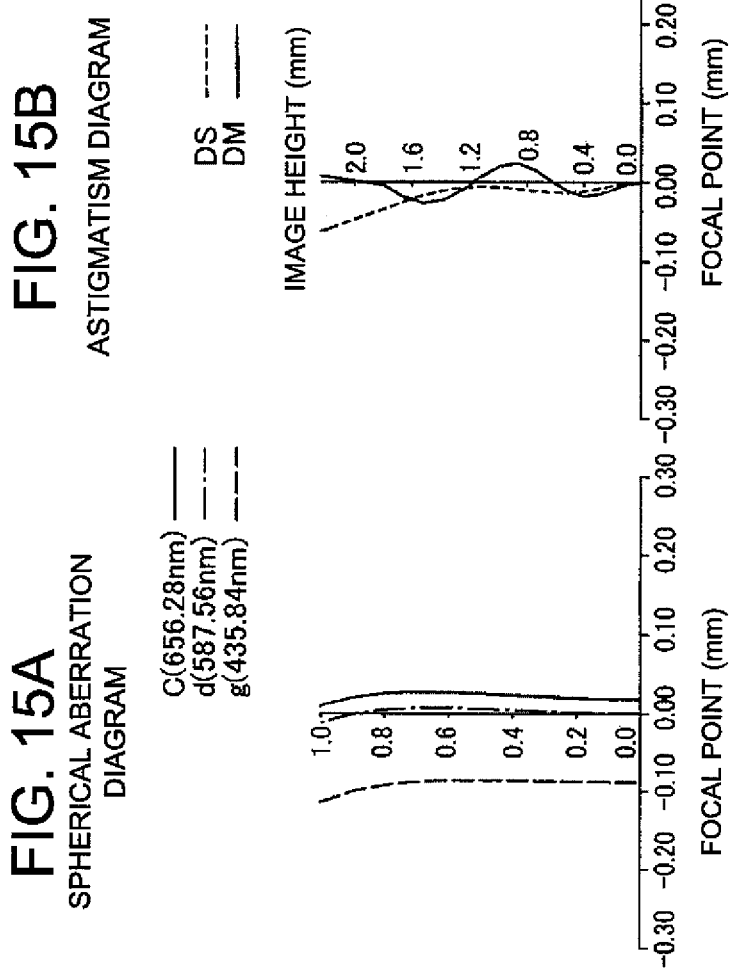
FIGS. 15A, 15B, 15C and 16 show aberration diagrams of lens groups in a wide-angle optical system in Example 1.
Figure 16:
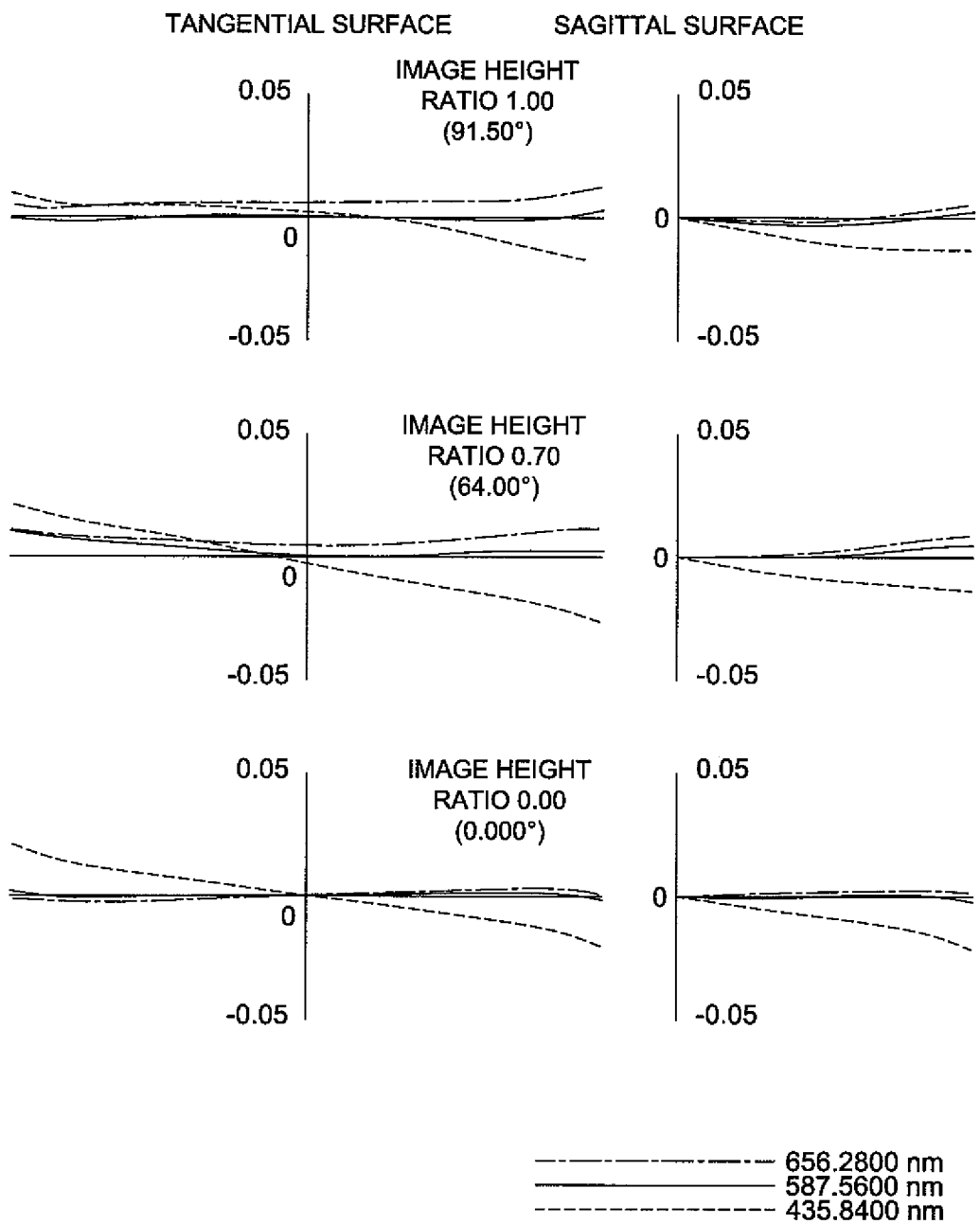

FIG. 5 is a sectional view showing an arrangement of lens groups in wide-angle optical system of Example 1. FIGS. 15 and 16 show aberration diagrams of the lens groups in the wide-angle optical system in Example 1.

Wide-angle optical system 1A of Example 1 is composed of, as shown in FIG. 5, front group Grf aperture stop ST, and rear group Grr, in this order from the object side to the image side. The front group Grf is a three-component optical system with negative-negative-positive components, which is composed of a negative meniscus lens which is convex toward the object side (first lens L1), a negative meniscus lens which is convex toward the object side (second lens L2), and a positive bi-convex lens (third lens L3), in this order from the object side to the image side. The rear group Grr is a two-component optical system with positive-negative components, which is composed of a positive bi-convex lens (fourth lens L4) and a negative bi-concave lens (fifth lens L5) in this order from the object side to the image side. Each of the paired lenses arranged at the both sides of the aperture stop ST, which are the third lens L3 and the fourth lens L4, has a surface opposite from the aperture stop ST, namely the object-side surface of the third lens L3 and the image-side surface of the fourth lens L4, and they are convex surfaces. Each of the second through fifth lenses L2 to L5 has opposing surfaces which are aspheric surfaces, and is a lens made of a resin material, such as plastic.

On the image side of the rear group Grr (the image side of the fifth lens L5), there is arranged a light-receiving surface of image pickup element SR through parallel flat plate FT serving as a filter. The parallel flat plate FT indicates various types of optical filters and a cover glass of the image pickup element.

The sign ri given to respective lens surfaces (i=1, 2, 3, . . . ) in FIG. 5 represents the i-th lens surface which is defined by numbering from the object side (where the cemented lens surfaces are defined to be numbered as one surface). The surface represented by sign ri followed by the asterisk "*" indicates that it is an aspheric surface. Incidentally, each of aperture stop ST, opposing sides of parallel flat plate FT and a light-receiving surface of image pickup element SR is handled as one surface. Such the handling and the meaning of signs are the same as those in Examples 2 to 10 which will be described later (in FIGS. 6 to 14). However, the aforesaid meaning of "the same" does not signify "exactly the same". For example, the lens surfaces arranged at the closest position to the object is represented by the same sign (r1) in FIGS. 5 to 14 of Examples 2 to 10, respectively. However, it does not mean that each lens surface has the same curvature radius through Examples 2 to 10.

Under the structure of this kind, a ray entering from the object side passes through first lens L1, second lens L2, third lens L3, aperture stop ST, fourth lens L4, fifth lens L5, and parallel flat plate FT in this order, along optical axis AX, and forms an optical image of a photographic subject on a light-receiving surface of image pickup element SR. Then, in the image pickup element SR, the optical image is converted into electric signal. A predetermined digital image processing is applied to this electric signal in case of need, and the resulting electric signal is recorded on a memory of a digital apparatus such as, for example, a digital camera, as digital image signals, or is transmitted to other digital apparatuses through wire or through wireless communications.

Construction data of respective lenses in wide-angle optical system 1A of Example 1 will shown below.

Numerical Example 1

Unit mm

Surface data

| Surface Number | r | d | nd | vd |
|---|---|---|---|---|
| Object plane | ∞ | ∞ | | |
| 1 | 13.67 | 0.7 | 1.883 | 40.8 |
| 2 | 5.24 | 3.31 | | |
| 3* | 10.00 | 0.95 | 1.531 | 56 |
| 4* | 1.00 | 1.21 | | |
| 5* | 2.48 | 1.94 | 1.632 | 23 |
| 6* | −7.64 | 0.8 | | |
| 7(Stop) | ∞ | 0.42 | | |
| 8* | 3.78 | 1.77 | 1.531 | 56 |
| 9* | −0.87 | 0.1 | | |
| 10* | −2.76 | 0.69 | 1.632 | 23 |
| 11* | 3.45 | | | |
| 12 | ∞ | 0.500 | 1.564 | 47 |
| 13 | ∞ | 0.546 | | |
| Image plane | ∞ | | | |

-continued

Unit mm

Aspheric Surface data

Third surface $K = -11.6, A4 = -5.45E-03, A6 = 2.62E-04, A8 = -6.68E-06,$
$A10 = 2.74E-07$
Fourth surface $K = -2.4, A4 = 0.109, A6 = -3.47E-02, A8 = 3.29E-03,$
$A10 = 2.85E-04$
Fifth surface $K = -2.3, A4 = 0.006, A6 = 5.98E-03, A8 = -4.25E-03,$
$A10 = 1.16E-03$
Sixth surface $K = 0, A4 = 0.016, A6 = -3.92E-03, A8 = 3.21E-03, A10 = -9.29E-04$
Eighth surface $K = 0, A4 = -0.035, A6 = 1.33E-02, A8 = -1.66E-03,$
$A10 = -3.35E-03$
Ninth surface $K = -2.8, A4 = -0.079, A6 = 5.99E-03, A8 = 2.10E-03$
Tenth surface $K = -20, A4 = -0.113, A6 = -2.12E-02, A8 = 1.12E-02$
Eleventh surface $K = -47.1, A4 = -0.104, A6 = 1.79E-02, A8 = -3.60E-04,$
$A10 = 4.20E-04$ Various types of data

| Focal length | 1.099 |
| F number | 2.762 |
| Half angle of view | 91.5 |
| Image height | 2.276 |
| Total lens length | 14.345 |
| BF | 1.455 |

In the aforesaid surface data, each of the surface numbers corresponds to number i in sign ri (i=1, 2, 3, . . . ) given to each lens shown in FIG. 5. The surface represented by the number i followed by the asterisk "*" indicates that it is an aspheric surface (a surface having a refractive optical surface in a aspheric shape, or having a refractive function which are equivalent to an aspheric surface).

Further, "r" represents a curvature radius (where, unit is mm) of each surface, "d" represents a space between lens surfaces on the optical axis (an axial surface distance) under the condition that the focus is adjusted to infinity, "nd" represents a refractive index at d line (wavelength 587.56 nm) of each lens, and "vd" represents the Abbe number. Incidentally, the curvature radius of each surface of aperture stop ST, opposing sides of parallel flat plate, and of a light-receiving surface of imaging element SR is ∞ (infinity), because the each surface is flat.

The aforesaid aspheric surface data shows values of a quadratic surface parameter (conic constant K) and aspheric surface constant Ai (i=4, 6, 8, 10, and 12) of a surface represented as an aspheric surface (the surface represented by the number i followed by the asterisk "*"). An aspheric shape of an optical surface is defined by the following expression with a local orthogonal coordinate system (x, y, z), where a surface vertex is at the origin and the direction from the object toward the image pickup element is defined to direct a positive direction of z-axis.

$$z(h) = c \times h^2 / [1 + \{1 - (1+K)c^2 \times h^2\}^{1/2}] + \Sigma Ai \times h^i$$

In the expression, z(h) represents an amount of displacement (measured from the surface vertex) in the z-axis direction at a position of height h, h represents a height ($h^2 = x^2 + y^2$)

in the direction perpendicular to the z-axis, c represents a paraxial curvature (reciprocal of curvature radius), Ai represents an aspheric surface coefficient in i-th order, and K represents a quadratic surface parameter (conic constant). In the above aspheric data, "En" represents "10 raised to the power of n". For example, "E+001" means "10 raised to the power of plus one", and "E−003" means "10 raised to the power of minus three".

Aberrations of wide-angle optical system 1A of Example 1 under the aforesaid lens arrangement and structure are shown in FIGS. 15 and 16. FIG. 15A shows spherical aberration (sine condition) (LONGITUDINAL SPHERICAL ABERRATION), FIG. 15B shows astigmatism (ASTIGMATISM FIELD CURVER) and FIG. 15C shows distortion aberration (DISTORTION). The horizontal axis of the spherical aberration indicates a shift of a focal point position in a unit arm, and its vertical axis indicates a value normalized by an incident height. The horizontal axis of the astigmatism indicates a shift of a focal point position in a unit of mm, and its vertical axis indicates an image height in a unit mm. The horizontal axis of the distortion indicates a ratio (%) of an actual image height to an ideal image height, and the vertical axis indicates its angle of view in a unit of degree (which indicates the angle of view up to a half angle of view of 90° in this case). In the diagram of astigmatism, a dotted line indicates a sagittal surface, and a solid line indicates a tangential surface respectively. In the diagram of astigmatism, a broken line (DS) represents sagittal, and a solid line (DM) represents tangential. The diagram of spherical aberration shows aberrations for three types of light, with an alternate long and short dash line for d-line (wavelength of 587.56 nm), a broken line for g-line (wavelength of 435.84 nm), and a solid line for C-line (wavelength of 656.28 nm). The diagrams of astigmatism and distortion is obtained as a result of using the d-line line (wavelength of 587.56 nm).

Further, FIG. 16 shows a lateral aberration, and the left portion indicates that for a tangential (meridional) surface, the right portion indicates that for a sagittal (radial) surface. Further, FIG. 16 shows the lateral aberrations for the maximum angle of view and the medium angle of view, and that on the axis, in this order from the upper part. Each diagram of lateral aberration shows lateral aberration (mm) for the design wavelength λ at "the ratio of image heights Y'/Y'max (half angle of view ω°)". In the diagrams of lateral aberration, the ratios of image heights Y'/Y'max have the value of 1.00, 0.70, 0.00 in this order from the upper side. The ratio of image heights Y'/Y'max means a relative image height obtained by normalizing the image height Y' by the maximum image height Y'max. The horizontal axis represents a height of incident ray for the primary ray in a unit of mm, and the vertical axis represents a displacement from the primary ray on the image plane in a unit of mm. Each diagram of lateral aberrations also shows the aberrations for three types of light, with an alternate long and short dash line for d-line (wavelength of 587.56 nm) as the design wavelength λ, a broken line for g-line (wavelength of 435.84 am), and a solid line for C-line (wavelength of 656.28 nm).

The above definitions are the same as those in the construction data relating to Examples 2 to 10 shown below and those in FIGS. 18 to 34 which show the various aberrations.

Example 2

Figure 6:
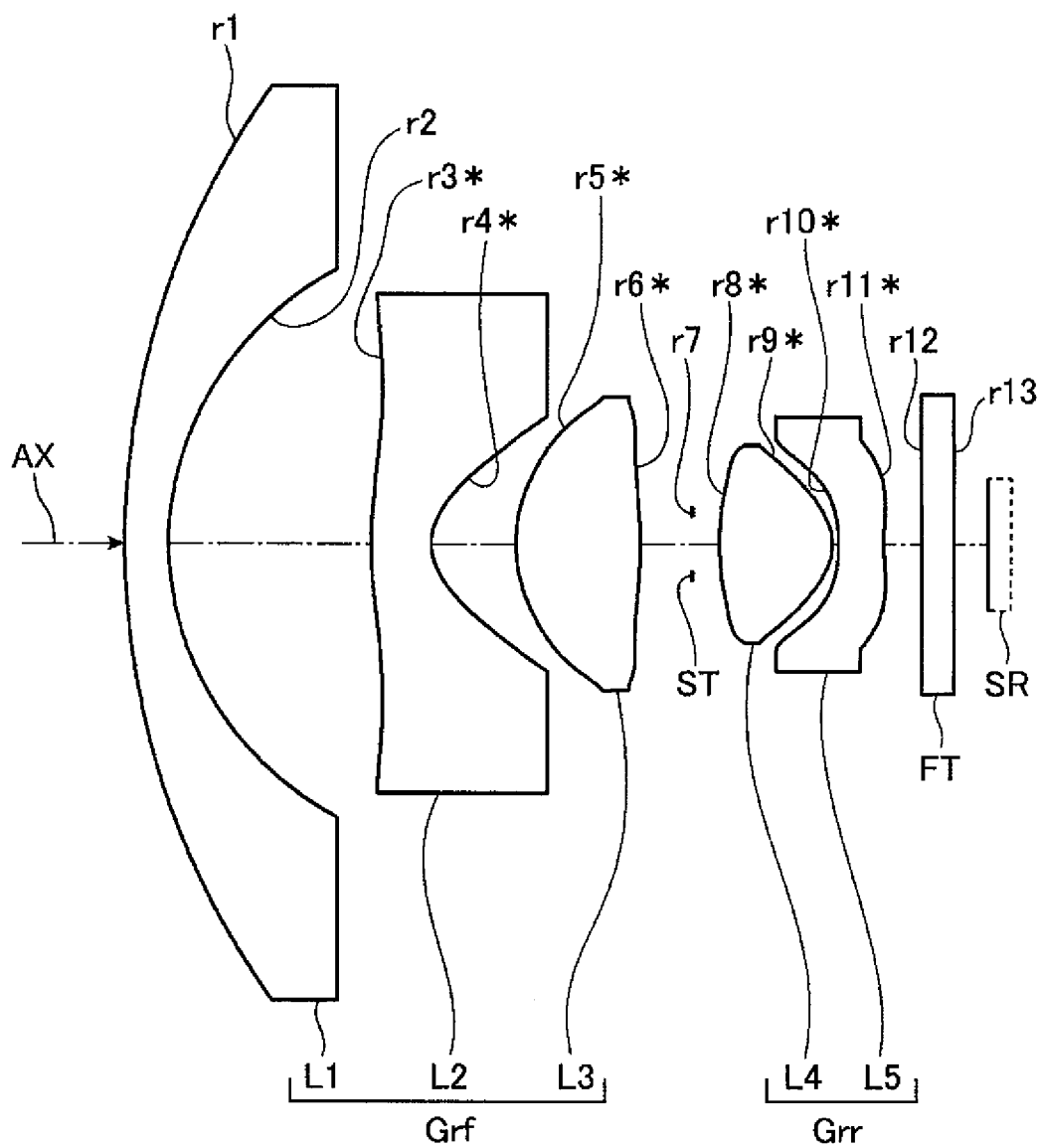
FIG. 6 is a sectional view showing an arrangement of lens groups in a wide-angle optical system of Example 2.
Figure 17:
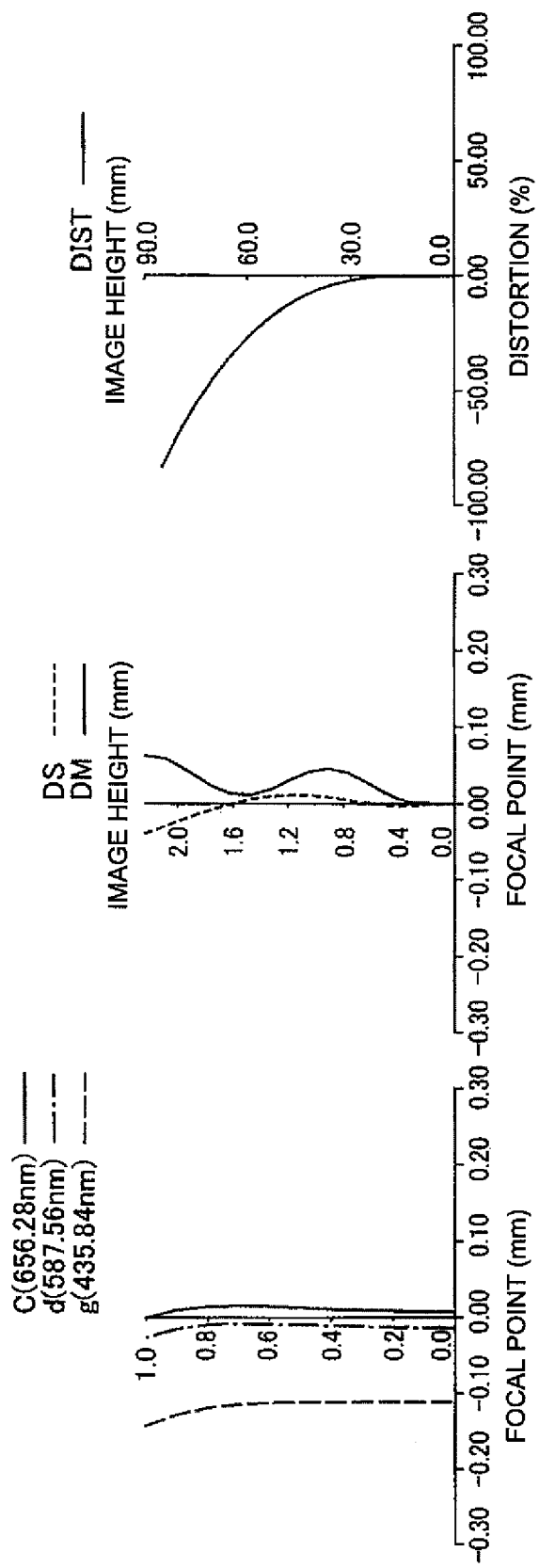
FIGS. 17A, 17B, 17C, and 18 show aberration diagrams of lens groups in a wide-angle optical system in Example 2.
Figure 18:
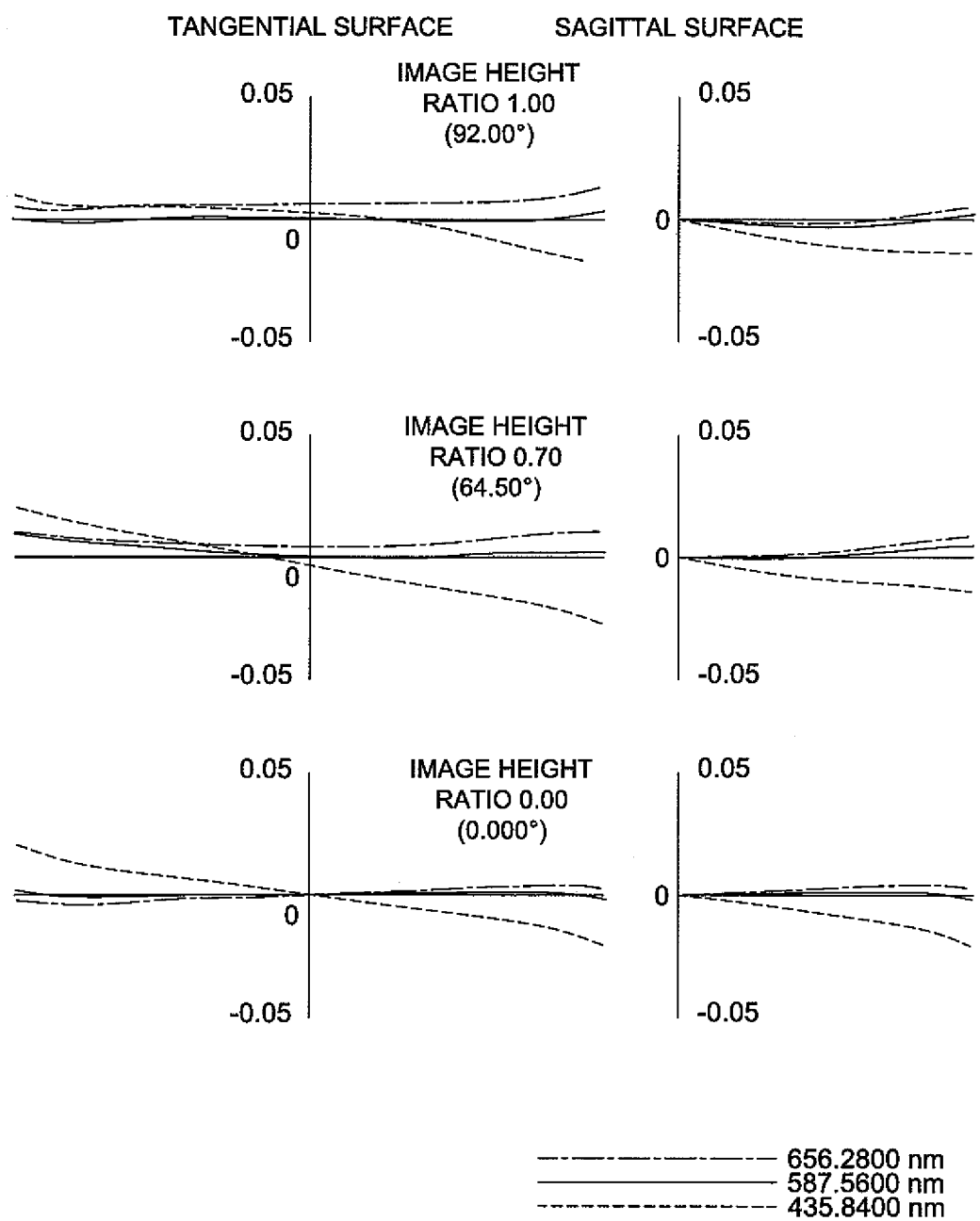

FIG. 6 is a sectional view showing an arrangement of lens groups in a wide-angle optical system of Example 2. FIGS. 17 and 18 show aberration diagrams of lens groups in a wide-angle optical system in Example 2.

Wide-angle optical system 1B of Example 2 is composed as shown in FIG. 6, front group Grf, aperture stop ST, and rear group Grr, in this order from the object side to the image side. The front group Grf is a three-component optical system with negative-negative-positive components, which is composed of a negative meniscus lens which is convex toward the object side (first lens L1), a negative meniscus lens which is convex toward the object side (second lens L2), and a positive bi-convex lens (third lens L3), in this order from the object side to the image side. The rear group Grr is a two-component optical system with positive-negative components, which is composed of a positive bi-convex lens (fourth lens L4) and a negative bi-concave lens (fifth lens L5) in this order from the object side to the image side. Each of the paired lenses arranged at the both sides of the aperture stop ST, which are the third lens L3 and the fourth lens L4, has a surface opposite from the aperture stop ST, namely die object-side surface of the third lend L3 and the image-side surface of the fourth lens L4, and they are convex surfaces. Each of the second through fifth lenses L2 to L5 has opposing surfaces which are aspheric surfaces, and is a lens made of a resin material, such as plastic.

On the image side of the rear group Grr (the image side of the fifth lens L5), there is arranged a light-receiving surface of image pickup element SR through parallel flat plate FT serving as a filter. The parallel flat plate FT indicates various types of optical filters and a cover glass of the image pickup element.

Construction data of respective lenses in wide-angle optical system 1B of Example 2 will be shown below.

Numerical Example 2

| Unit mm | | | | |
|---|---|---|---|---|
| Surface data | | | | |
| Surface Number | r | d | nd | vd |
| Object plane | ∞ | ∞ | | |
| 1 | 15.87 | 0.8 | 1.883 | 40.8 |
| 2 | 6.1 | 3.68 | | |
| 3* | 8.16 | 1.1 | 1.544 | 56 |
| 4* | 1.13 | 1.53 | | |
| 5* | 2.98 | 2.26 | 1.632 | 23 |
| 6* | −8.95 | 0.94 | | |
| 7(Stop) | ∞ | 0.49 | | |
| 8* | 4.34 | 2.06 | 1.544 | 56 |
| 9* | −0.96 | 0.12 | | |
| 10* | −2.49 | 0.82 | 1.632 | 23 |
| 11* | 5.09 | | | |
| 12 | ∞ | 0.500 | 1.564 | 47 |
| 13 | ∞ | 0.546 | | |
| Image plane | ∞ | | | |

Aspheric Surface data

Third surface

K = −16.7, A4 = −3.73E−03, A6 = 2.09E−04, A8 = −8.90E−06,
A10 = 2.81E−07
Fourth surface K = −1.9, A4 = 0.042, A6 = −6.67E−03, A8 = −4.90E−04,
A10 = 2.01E−04
Fifth surface K = −2.5, A4 = 0.005, A6 = 2.67E−03, A8 = −1.46E−03,
A10 = 2.92E−04
Sixth surface

K = 0, A4 = 0.01, A6 = −1.96E−03, A8 = 1.18E−03, A10 = −2.53E−04

-continued

Unit mm

Eighth surface

K = 0, A4 = −0.023, A6 = 6.26E−03, A8 = 2.41E−04, A10 = −1.35E−03
Ninth surface

K = −3.1, A4 = −0.054, A6 = 2.66E−03, A8 = 1.08E−03
Tenth surface

K = −20, A4 = −0.071, A6 = −1.01E−02, A8 = 3.88E−03
Eleventh surface

K = −71.2, A4 = −0.064, A6 = 8.41E−03, A8 = −1.35E−04,
A10 = −1.17E−04

Various types of data

| Focal length | 1.221 |
| F number | 2.762 |
| Half angle of view | 91.500 |
| Image height | 2.276 |
| Total lens length | 14.345 |
| BF | 1.455 |

FIGS. 17A, 17B, 17C show spherical aberration (sine condition), astigmatism, and distortion of wide-angle optical system 1B of Example 2, obtained under the aforesaid lens arrangement and structure, and FIG. 18 shows its lateral aberrations.

Example 3

Figure 7:
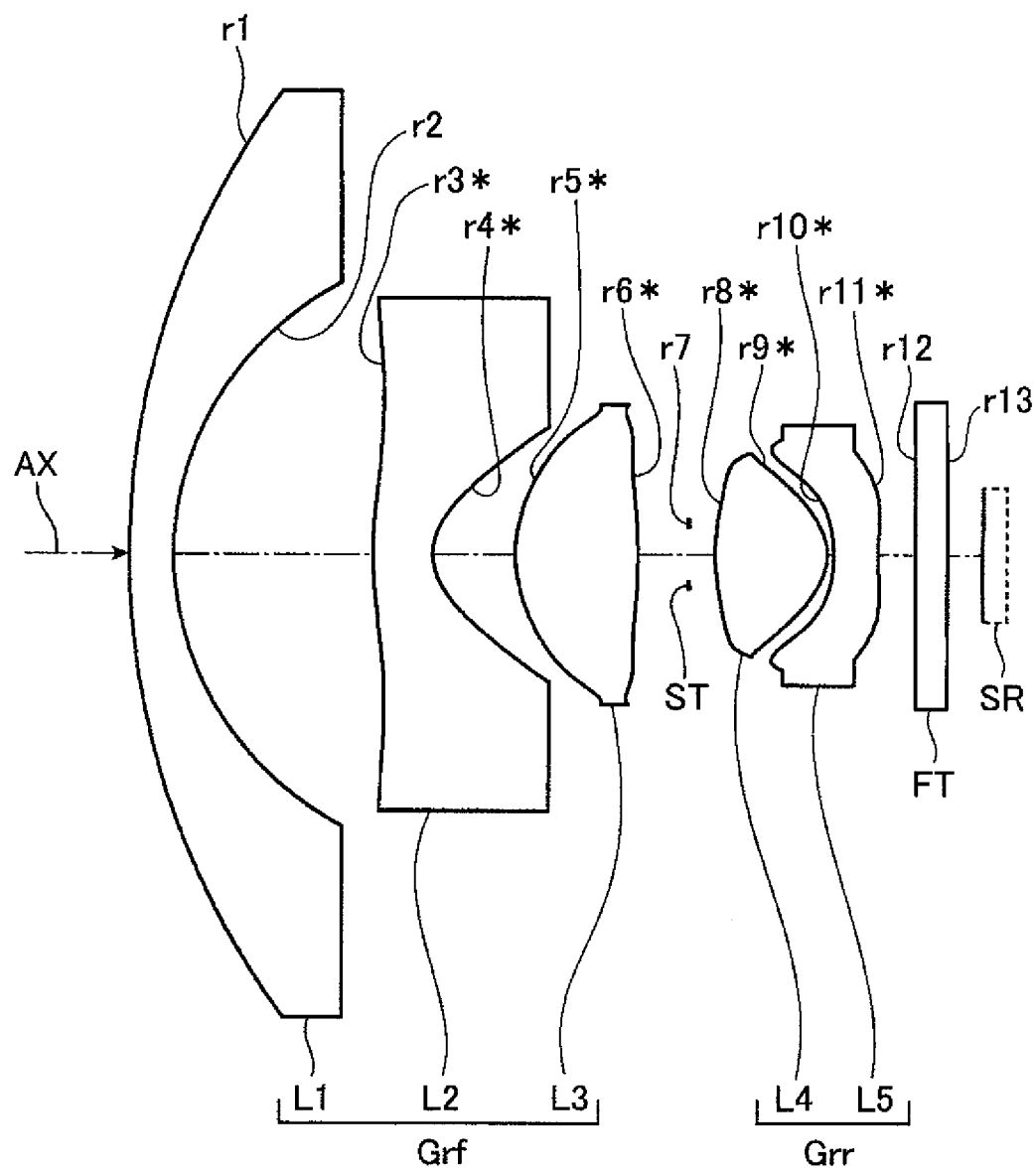
FIG. 7 is a sectional view showing an arrangement of lens groups in a wide-angle optical system of Example 3.
Figure 19:
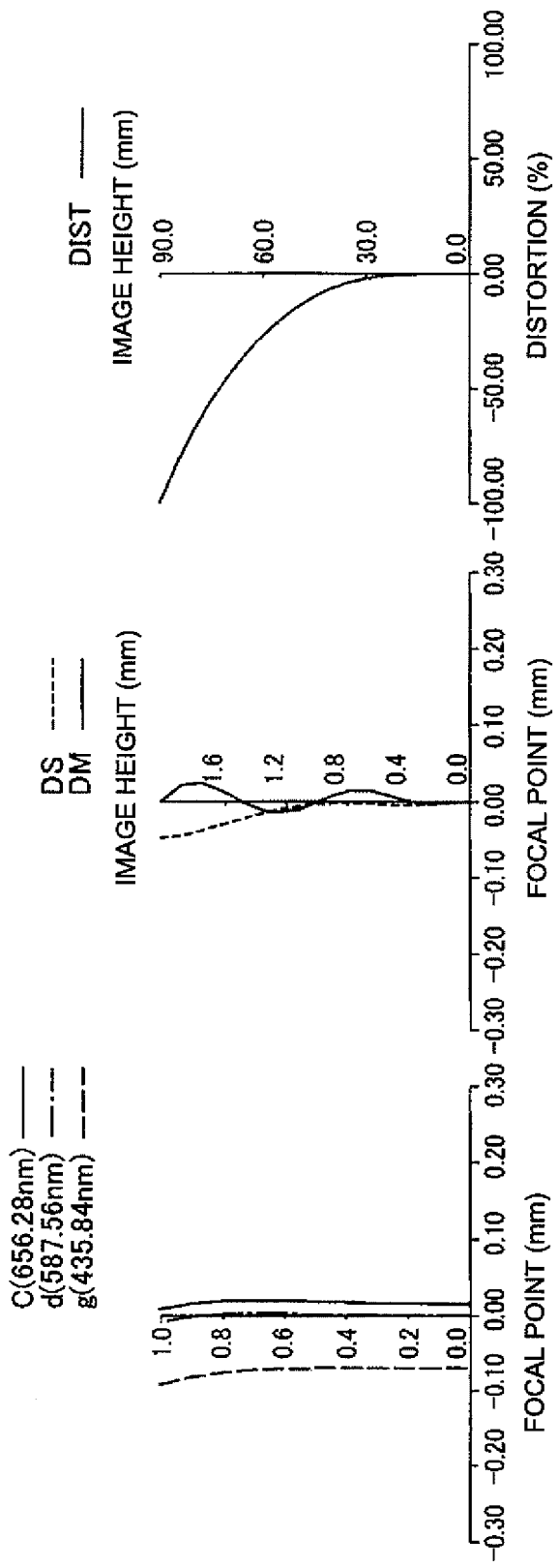
FIGS. 19A, 19B, 19C and 20 show aberration diagrams of lens groups in a wide-angle optical system in Example 3.
Figure 20:
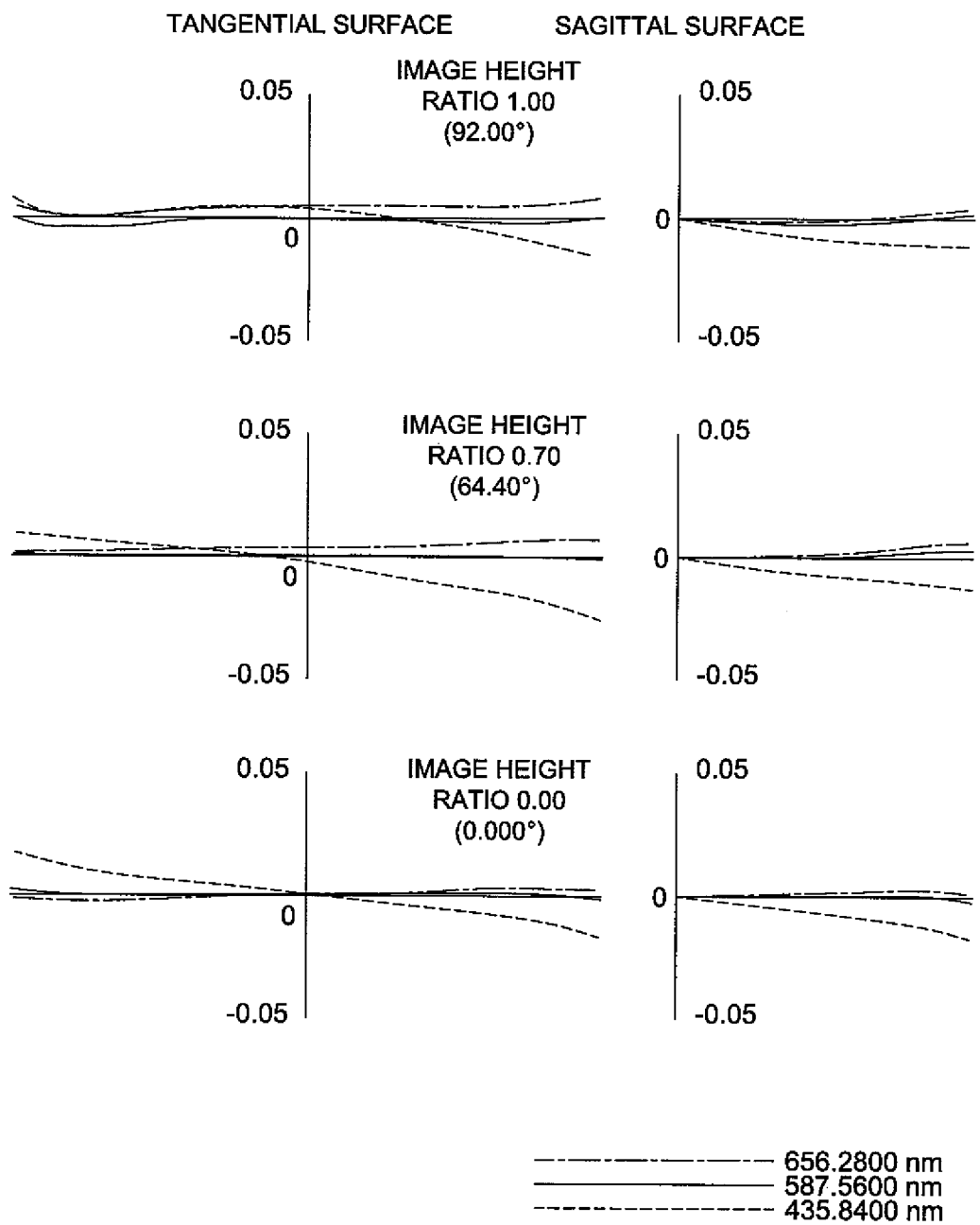

FIG. 7 is a sectional view showing an arrangement of lens groups in a wide-angle optical system of Example 3. FIGS. 19 and 20 show aberrations diagram of lens groups in a wide-angle optical system in Example 3.

Wide-angle optical system 1C of Example 3 is composed of, as shown in FIG. 7, front group Grf; aperture stop ST, and rear group Grr, in this order from the object side to the image side. The front group Grf is a three-component optical system with negative-negative-positive components, which is composed of a negative meniscus lens which is convex toward the object side (first lens L1), a negative meniscus lens which is convex toward the object side (second lens L2), and a positive bi-convex lens (third lens L3), in this order from the object side to the image side. The rear group Grr is a two-component optical system with positive-negative components, which is composed of a positive bi-convex lens (fourth lens L4) and a negative bi-concave lens (fifth lens L5) in this order from the object side to the image side. Each of the paired lenses arranged at the both sides of the aperture stop ST, which are the third lens L3 and the fourth lens L4, has a surface opposite from the aperture stop ST, namely the object-side surface of the third lend L3 and the image-side surface of the fourth lens L4, and they are convex surfaces. Each of the second through fifth lenses L2 to L5 has opposing surfaces which are aspheric surfaces, and is a lens made of a resin material, such as plastic.

On the image side of the rear group Grr (the image side of the fifth lens L5), there is an arranged a light-receiving surface of image pickup element SR through parallel flat plate FT serving as a filter. The parallel flat plate FT indicates various types of optical filters and a cover glass of the image pickup element.

Construction data of respective lenses in wide-angle optical system 1C of Example 3 will be shown below.

Numerical Example 3

Unit mm

Surface data

| Surface Number | r | d | nd | νd |
|---|---|---|---|---|
| Object plane | ∞ | ∞ | | |
| 1 | 11.67 | 0.6 | 1.883 | 40.8 |
| 2 | 4.49 | 2.70 | | |
| 3* | 6 | 0.81 | 1.535 | 56 |
| 4* | 0.83 | 1.12 | | |
| 5* | 2.19 | 1.66 | 1.632 | 23 |
| 6* | −6.58 | 0.69 | | |
| 7(Stop) | ∞ | 0.36 | | |
| 8* | 3.20 | 1.52 | 1.535 | 56 |
| 9* | −0.71 | 0.09 | | |
| 10* | −1.83 | 0.60 | 1.632 | 23 |
| 11* | 3.75 | | | |
| 12 | ∞ | 0.429 | 1.564 | 47 |
| 13 | ∞ | 0.427 | | |
| Image plane | ∞ | | | |

Aspheric Surface data

Third surface

K = −16.7, A4 = −9.37E−03, A6 = 9.73E−04, A8 = −7.64E−05,
A10 = 4.45E−06
Fourth surface K = −1.9, A4 = 0.106, A6 = −3.10E−02, A8 = −4.20E−03,
A10 = 3.18E−03
Fifth surface K = −2.5, A4 = 0.013, A6 = 1.24E−02, A8 = −1.25E−02,
A10 = 4.64E−03
Sixth surface K = 0, A4 = 0.025, A6 = −9.09E−03, A8 = 1.01E−02, A10 = −4.02E−03
Eighth surface K = 0, A4 = −0.057, A6 = 2.91E−02, A8 = −2.07E−03,
A10 = −2.14E−02
Ninth surface K = −3.1, A4 = −0.136, A6 = 1.23E−02, A8 = 9.25E−03
Tenth surface K = −20.0, A4 = −0.178, A6 = −4.69E−02, A8 = 3.33E−02
Eleventh surface

K = −71.2, A4 = −0.161, A6 = 3.91E−02, A8 = −1.16E−03,
A10 = −1.86E−03

Various types of data

| Focal length | 0.933 |
| F number | 2.762 |
| Half angle of view | 92.000 |
| Image height | 1.977 |
| Total lens length | 12.288 |
| BF | 1.207 |

FIGS. 19A, 19B, 19C show spherical aberration (sine condition), astigmatism, and distortion of wide-angle optical system 1C of Example 3, obtained under the aforesaid lens arrangement and structure, and FIG. 20 shows its lateral aberrations.

Example 4

Figure 8:
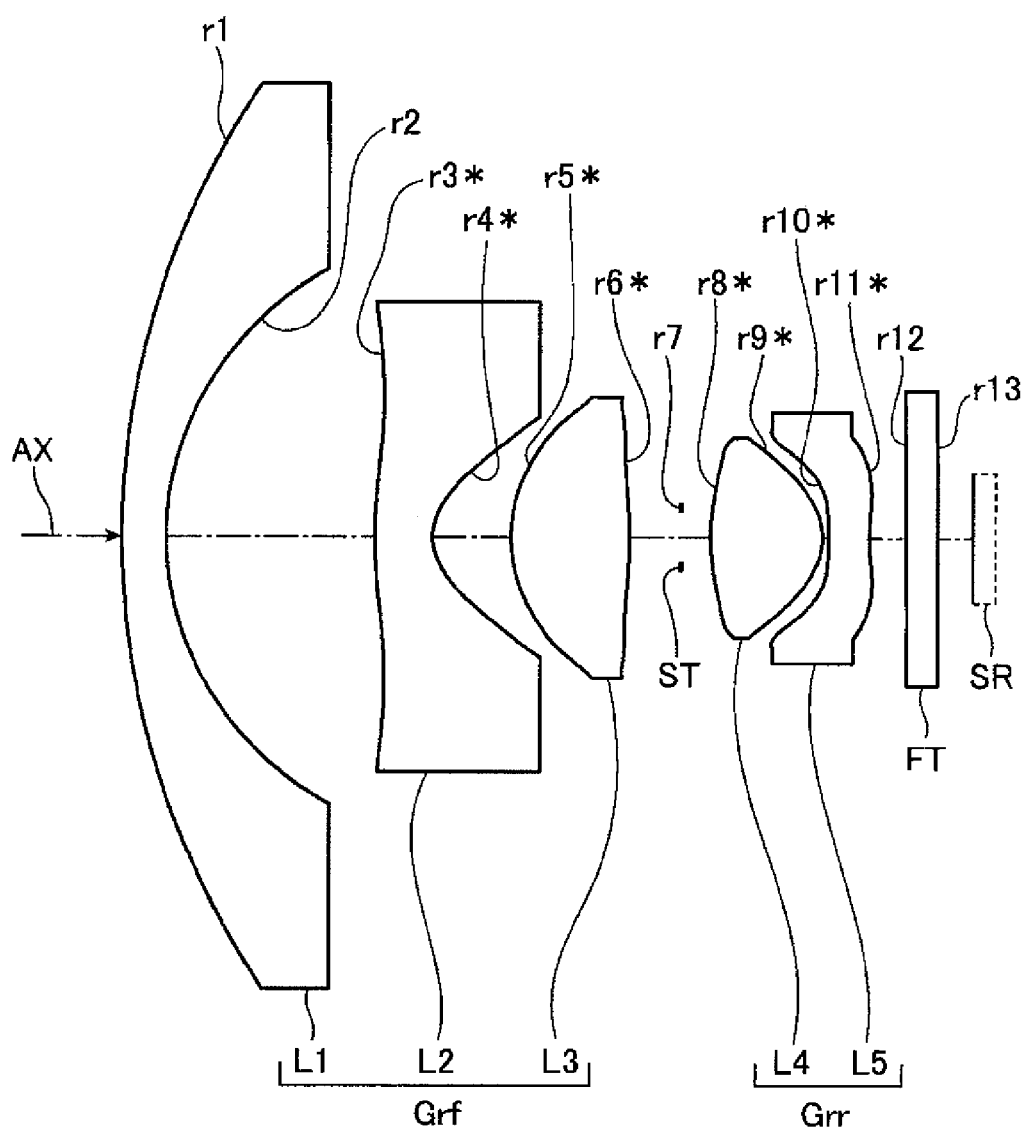
FIG. 8 is a sectional view showing an arrangement of lens groups in a wide-angle optical system of Example 4.
Figure 21:
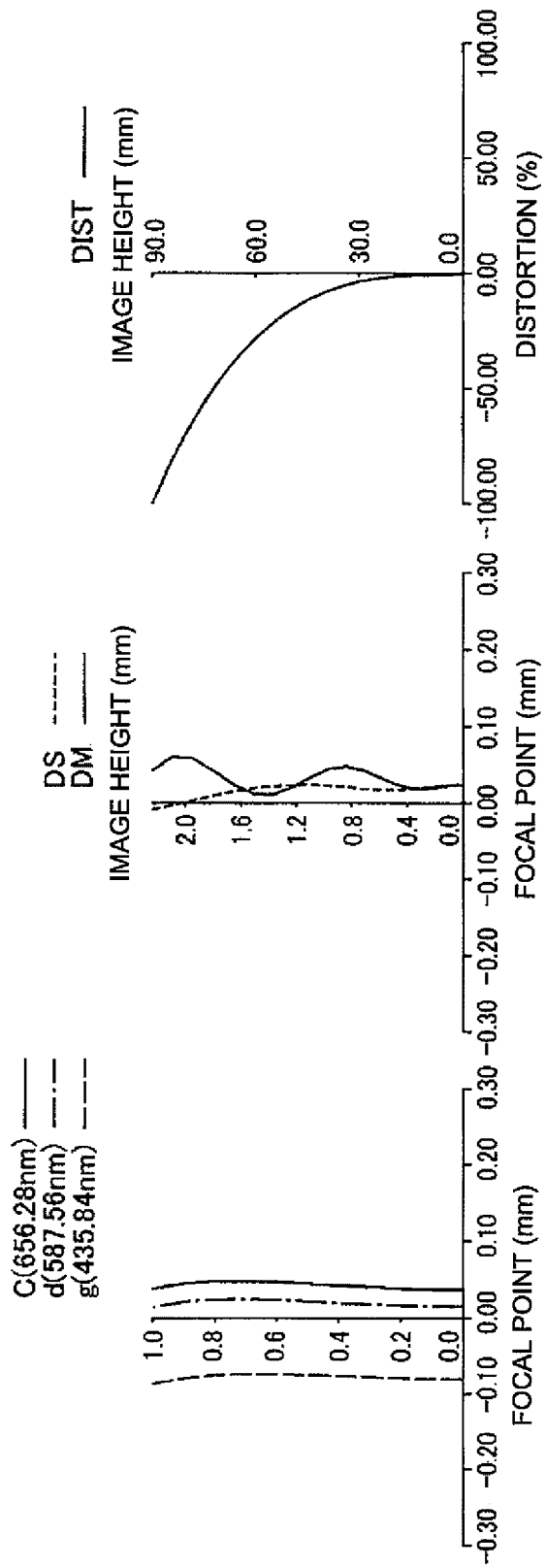
FIGS. 21A, 21B, 21C and 22 show aberration diagrams of lens groups in a wide-angle optical system in Example 4.
Figure 22:
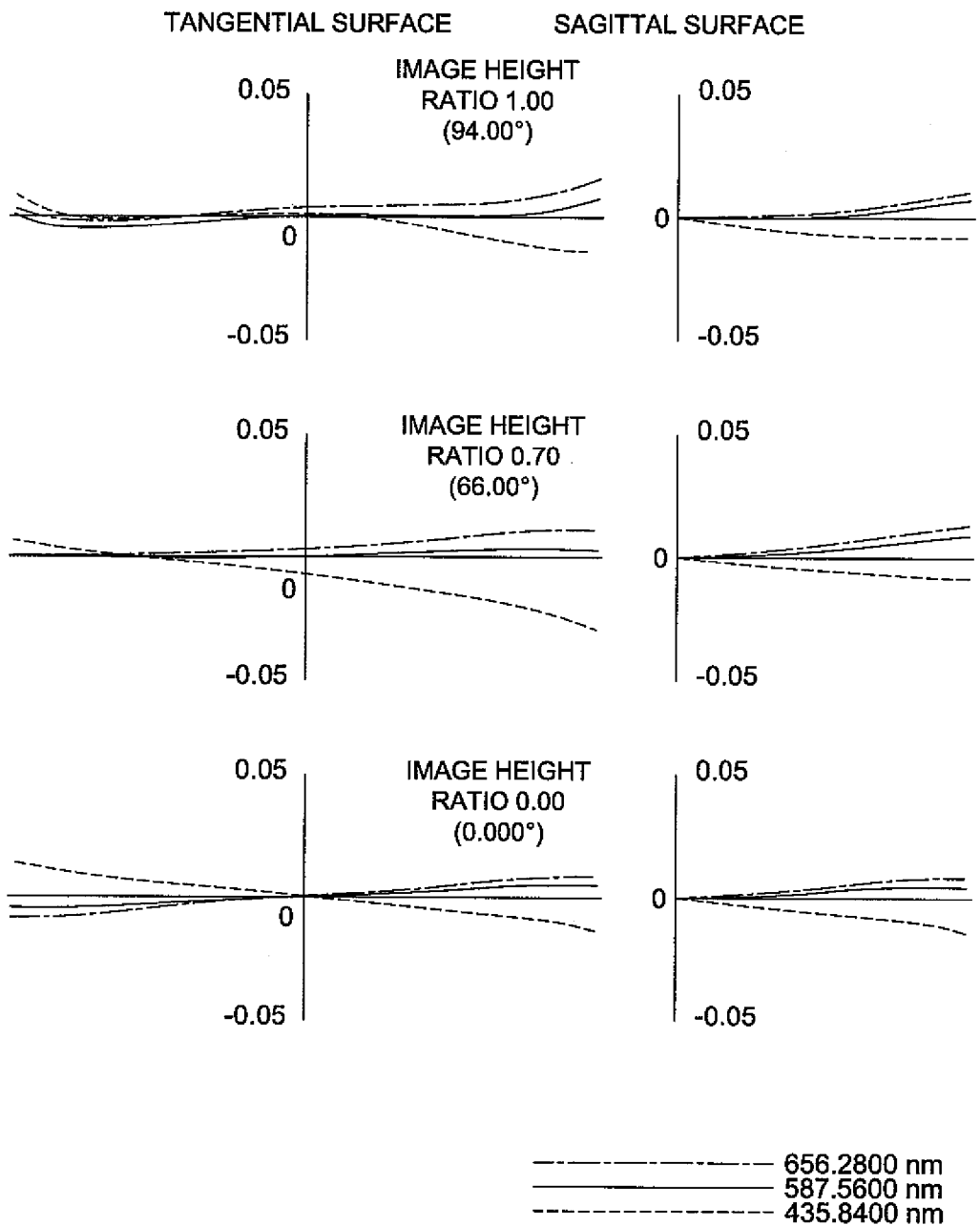

FIG. 8 is a sectional view showing an arrangement of lens groups in a wide-angle optical system of Example 4. FIGS. 21 and 22 show aberration diagrams of lens groups in a wide-angle optical system in Example 4.

Wide-angle optical system 1D of Example 4 is composed of, as shown in FIG. 8, front group Grf, aperture stop ST, and rear group Grr, in this order from the object side to the image side. The front group Grf is a three-component optical system with negative-negative-positive components, which is composed of a negative meniscus lens which is convex toward the object side (fast lens L1), a negative meniscus lens which is convex toward the object side (second lens L2), and a positive bi-convex lens (third lens L3), in this order from the object side to the image side. The rear group Grr is a two-component optical system with positive-negative components, which is composed of a positive bi-convex lens (fourth lens L4) and a negative bi-concave lens (fifth lens L5) in this order from the object side to the image side. Each of the paired lenses arranged at the both sides of the aperture stop ST, which are the third lens L3 and the fourth lens L4, has a surface opposite from the aperture stop ST, namely the object-side surface of the third lend L3 and the image-side surface of the fourth lens L4, and they are convex surfaces. Each of the second through fifth lenses L2 to L5 has opposing surfaces which are aspheric surfaces, and is a lens made of a resin material, such as plastic.

On the image side of the rear group Grr (the image side of the fifth lens L5), there is arranged a light-receiving surface of image pickup element SR through parallel flat plate FT serving as a filter. The parallel flat plate FT indicates various types of optical filters and a cover glass of the image pickup element.

Construction data of respective lenses in wide-angle optical system 1D of Example 4 will be shown below.

Numerical Example 4

| Unit mm | | | | |
|---|---|---|---|---|
| Surface data | | | | |
| Surface Number | r | d | nd | vd |
| Object plane | ∞ | ∞ | | |
| 1 | 14.16 | 0.7 | 1.883 | 40.8 |
| 2 | 5.23 | 3.32 | | |
| 3* | 7.86 | 0.92 | 1.531 | 56 |
| 4* | 0.97 | 1.24 | | |
| 5* | 2.51 | 1.88 | 1.632 | 23.9 |
| 6* | −7.87 | 0.81 | | |
| 7(Stop) | ∞ | 0.47 | | |
| 8* | 3.60 | 1.79 | 1.531 | 56 |
| 9* | −1.03 | 0.10 | | |
| 10* | −6.01 | 0.65 | 1.632 | 23.9 |
| 11* | 3.16 | | | |
| 12 | ∞ | 0.500 | 1.564 | 47 |
| 13 | ∞ | 0.520 | | |
| Image plane | ∞ | | | |

Aspheric Surface data

Third surface

K = −13.2, A4 = −5.74E−03, A6 = 2.57E−04, A8 = −5.85E−06, A10 = 3.36E−07
Fourth surface

K = −2.0, A4 = 0.106, A6 = −3.52E−02, A8 = 3.39E−03, A10 = 2.95E−04

-continued

| Unit mm |
|---|
| Fifth surface |

K = −1.7, A4 = 0.004, A6 = 5.87E−03, A8 = −4.13E−03, A10 = 1.18E−03
Sixth surface K = 0, A4 = 0.015, A6 = −2.89E−03, A8 = 2.96E−03, A10 = −1.01E−03
Eighth surface K = 0, A4 = −0.033, A6 = 1.27E−02, A8 = −1.43E−03, A10 = −3.27E−03
Ninth surface K = −2.7, A4 = −0.078, A6 = 6.34E−03, A8 = 1.96E−03
Tenth surface K = −17.3, A4 = −0.113, A6 = −2.20E−02, A8 = 1.11E−02
Eleventh surface

K = −30.0, A4 = −0.105, A6 = 1.88E−02, A8 = −2.90E−04, A10 = −4.32E−04

| Various types of data | |
|---|---|
| Focal length | 1.081 |
| F number | 2.890 |
| Half angle of view | 94.000 |
| Image height | 2.309 |
| Total lens length | 14.343 |
| BF | 1.453 |

FIGS. 21A, 21B, 21C show spherical aberration (sine condition), astigmatism, and distortion of wide-angle optical system 1D of Example 4, obtained under the aforesaid lens arrangement and structure, and FIG. 22 shows its lateral aberrations.

Example 5

Figure 9:
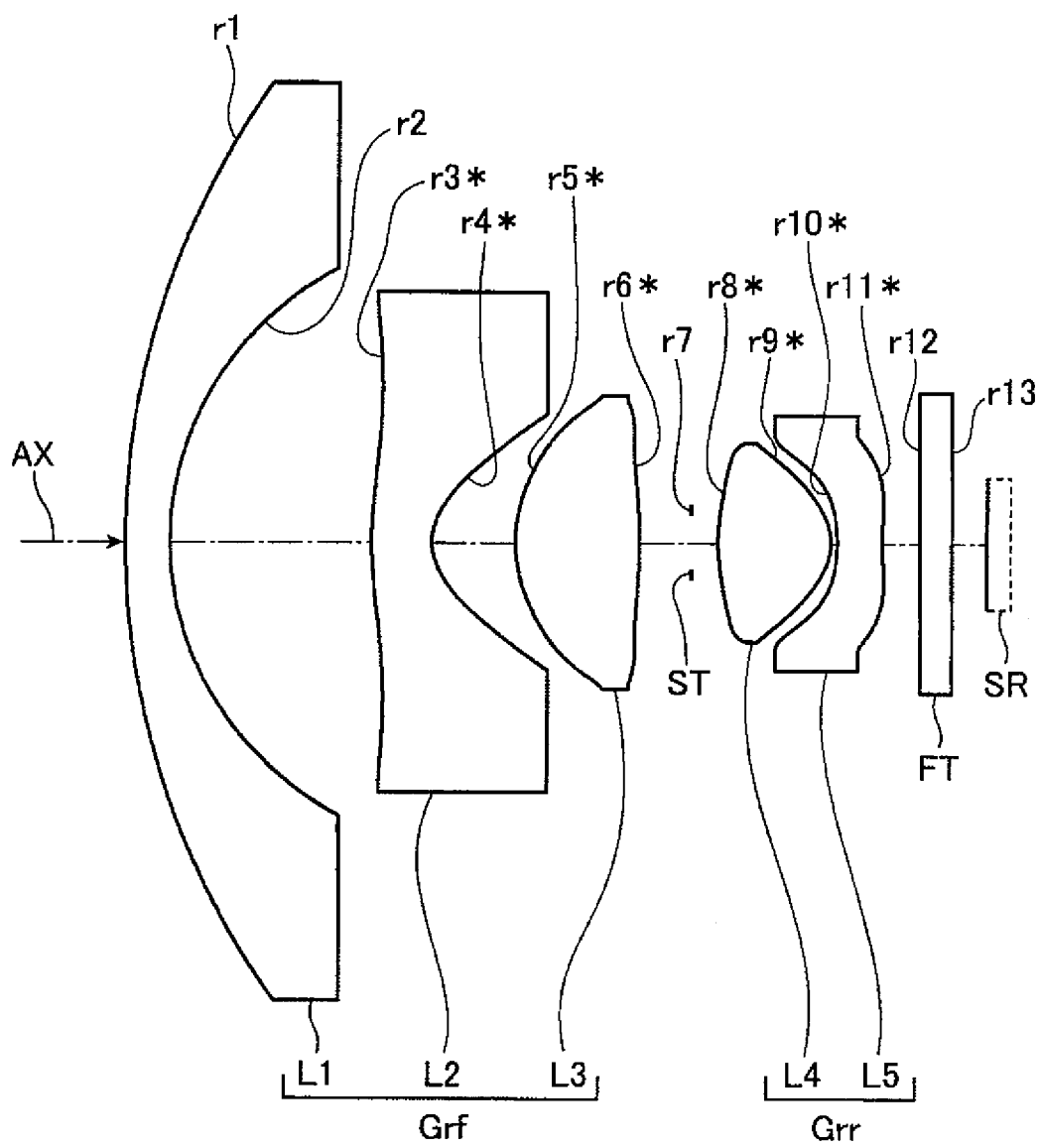
FIG. 9 is a sectional view showing an arrangement of lens groups in a wide-angle optical system of Example 5.
Figure 23:
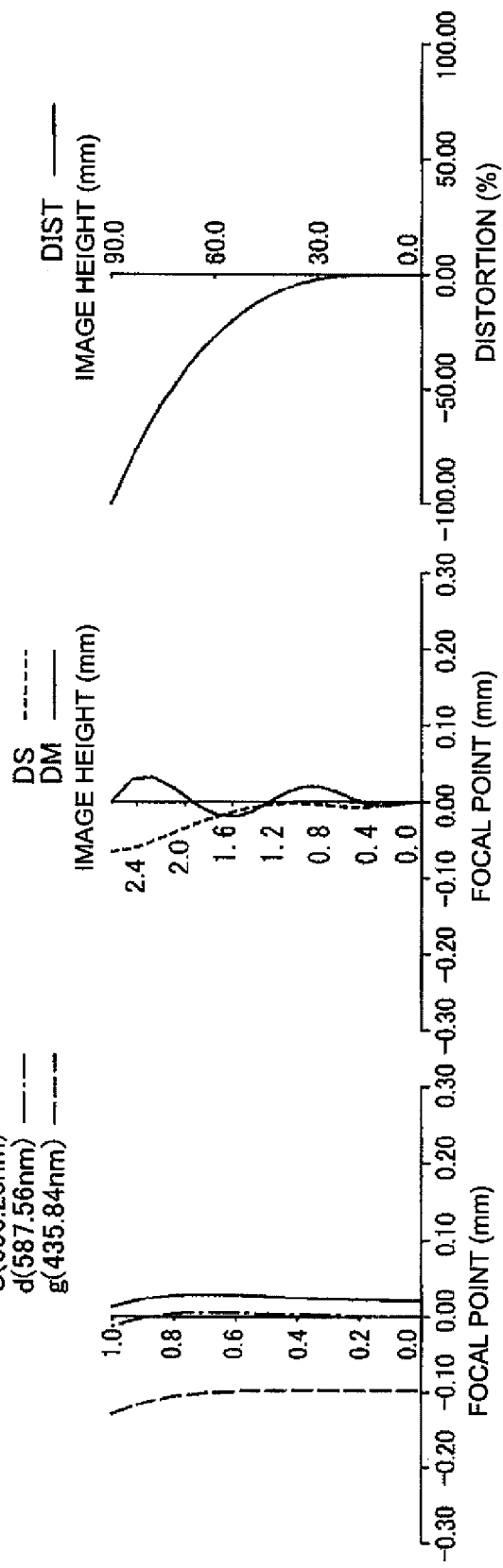
FIGS. 23A, 23B, 23C and 24 show aberration diagrams of lens groups in a wide-angle optical system in Example 5.
Figure 24:
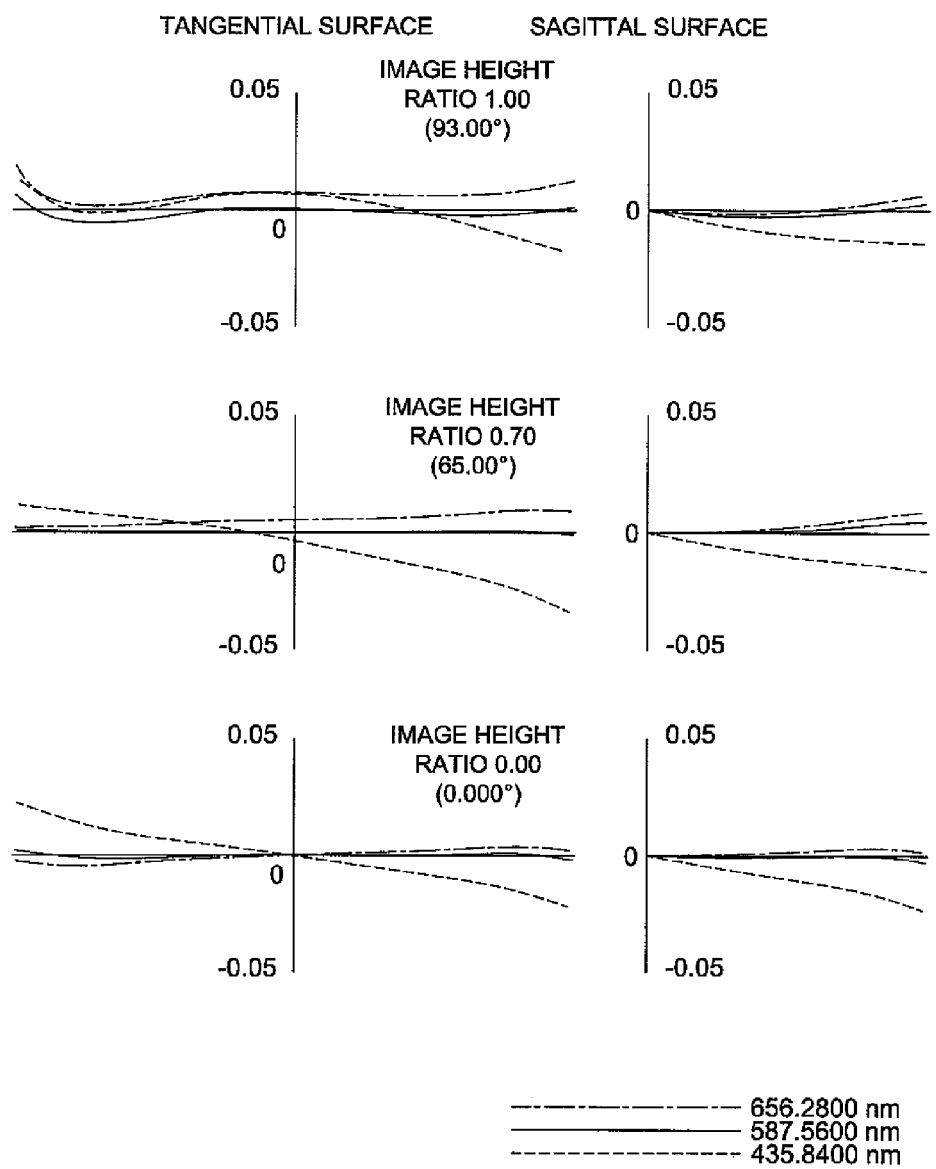

FIG. 9 is a sectional view showing an arrangement of lens groups in a wide-angle optical system of Example 5. FIGS. 23 and 24 show aberration diagrams of lens groups in a wide-angle optical system in Example 5.

Wide-angle optical system 1E of Example 5 is composed of, as shown in FIG. 9, front group Grf, aperture stop ST, and rear group Grr, in this order from the object side to the image side. The front group Grf is a three-component optical system with negative-negative-positive components, which is composed of a negative meniscus lens which is convex toward the object side (first lens L1), a negative meniscus lens which is convex toward the object side (second lens L2), and a positive bi-convex lens (third lens L3), in this order from the object side to the image side. The rear group Grr is a two-component optical system with positive-negative components, which is composed of a positive bi-convex lens (fourth lens L4) and a negative bi-concave lens (fifth lens L5) in this order from the object side to the image side. Each of the paired lenses arranged at the both sides of the aperture stop ST, which are the third lens L3 and the fourth lens L4, has a surface opposite from the aperture stop ST, namely the object-side surface of the third lend L3 and the image-side surface of the fourth lens L4, and they are convex surfaces. Each of the second through fifth lenses L2 to L5 has opposing surfaces which are aspheric surfaces, and is a lens made of a resin material, such as plastic.

On the image side of the rear group Grr (the image side of the fifth lens L5), there is arranged a light-receiving surface of image pickup element SR through parallel flat plate FT serving as a filter. The parallel flat plate FT indicates various types of optical filters and a cover glass of the image pickup element.

Construction data of respective lenses in wide-angle optical system 1E of Example 5 will be shown below.

Numerical Example 5

Unit mm

Surface data

| Surface Number | r | d | nd | vd |
|---|---|---|---|---|
| Object plane | ∞ | ∞ | | |
| 1 | 15.87 | 0.82 | 1.883 | 40.8 |
| 2 | 6.10 | 3.68 | | |
| 3* | 8.16 | 1.10 | 1.535 | 56 |
| 4* | 1.13 | 1.53 | | |
| 5* | 2.98 | 2.26 | 1.632 | 23 |
| 6* | −8.95 | 0.94 | | |
| 7(Stop) | ∞ | 0.49 | | |
| 8* | 4.34 | 2.06 | 1.535 | 56 |
| 9* | −0.96 | 0.12 | | |
| 10* | −2.49 | 0.82 | 1.632 | 23 |
| 11* | 5.09 | | | |
| 12 | ∞ | 0.583 | 1.564 | 47 |
| 13 | ∞ | 0.580 | | |
| Image plane | ∞ | | | |

Aspheric Surface data

Third surface $K = -16.7, A4 = -3.73E-03, A6 = 2.09E-04, A8 = -8.90E-06,$
$A10 = 2.81E-07$
Fourth surface $K = -1.9, A4 = 0.042, A6 = -6.67E-03, A8 = -4.90E-04,$
$A10 = 2.01E-04$
Fifth surface $K = -2.5, A4 = 0.005, A6 = 2.67E-03, A8 = -1.46E-03,$
$A10 = 2.92E-04$
Sixth surface $K = 0, A4 = 0.010, A6 = -1.96E-03, A8 = 1.18E-03, A10 = -2.53E-04$
Eighth surface $K = 0, A4 = -0.023, A6 = 6.26E-03, A8 = -2.41E-04,$
$A10 = -1.35E-03$
Ninth surface $K = -3.1, A4 = -0.054, A6 = 2.66E-03, A8 = 1.08E-03$
Tenth surface $K = -20.0, A4 = -0.071, A6 = -1.01E-02, A8 = 3.88E-03$
Eleventh surface $K = -71.2, A4 = -0.064, A6 = 8.41E-03, A8 = -1.35E-04,$
$A10 = -1.17E-04$ Various types of data

| Focal length | 1.268 |
|---|---|
| F number | 2.762 |
| Half angle of view | 93.000 |
| Image height | 2.723 |
| Total lens length | 16.625 |
| BF | 1.641 |

FIGS. 23A, 23B, 23C show spherical aberration (sine condition), astigmatism, and distortion of wide-angle optical system 1E of Example 5, obtained under the aforesaid lens arrangement and structure, and FIG. 24 shows its lateral aberrations.

Example 6

Figure 10:
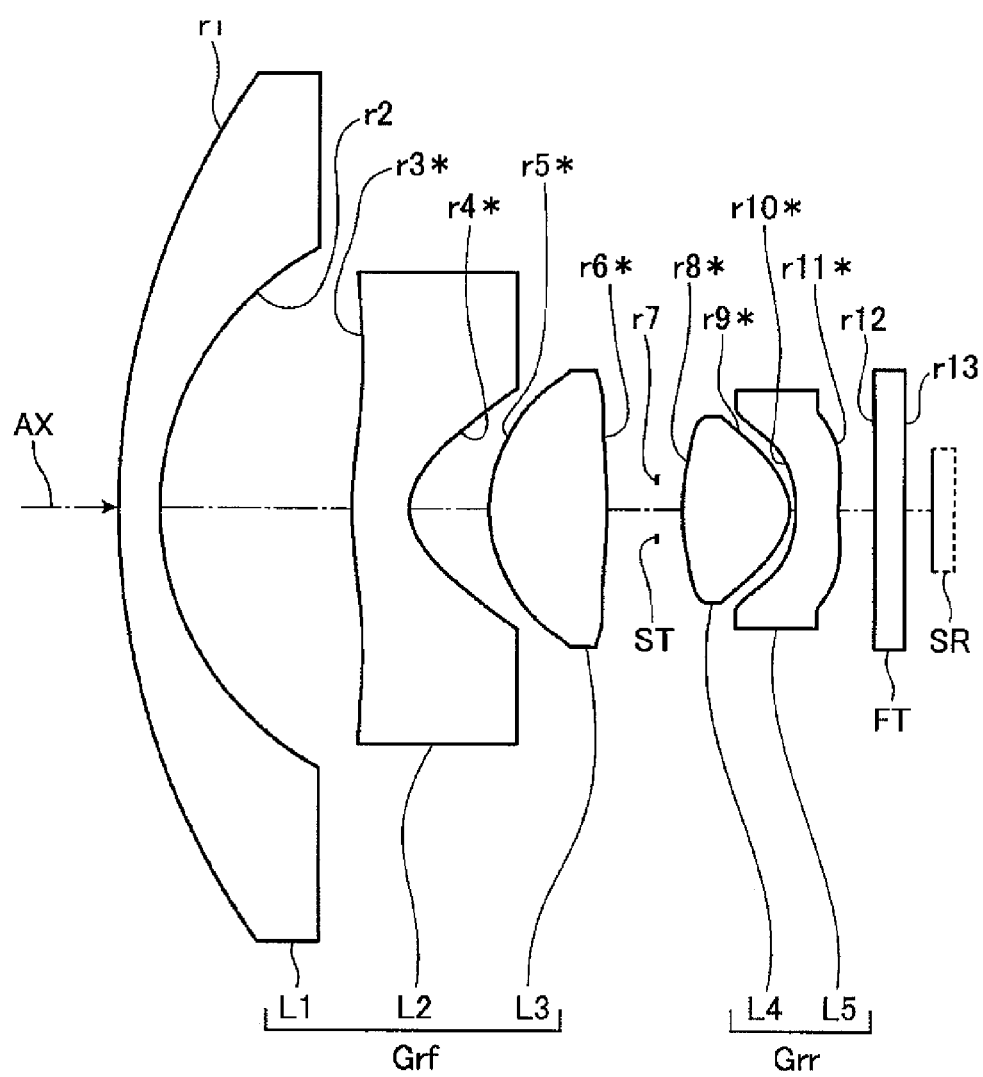
FIG. 10 is a sectional view showing an arrangement of lens groups in a wide-angle optical system of Example 6.
Figure 25:
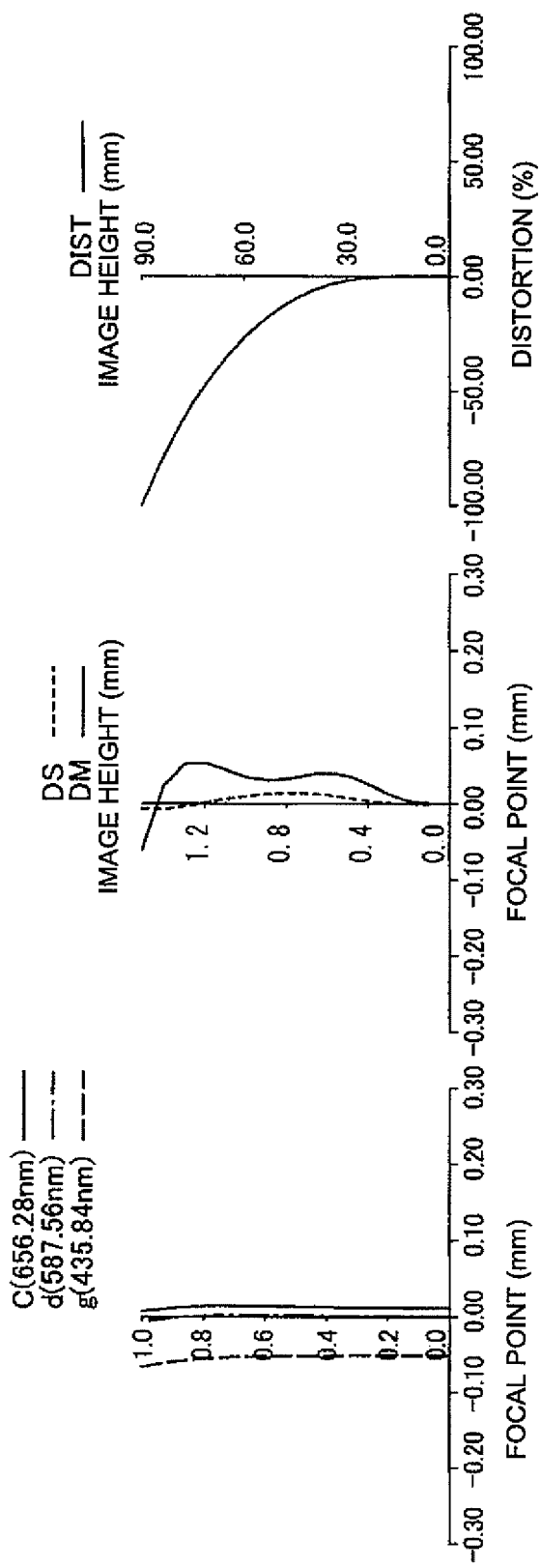
FIGS. 25A, 25B, 25C, and 26 show aberration diagrams of lens groups in a wide-angle optical system in Example 6.
Figure 26:
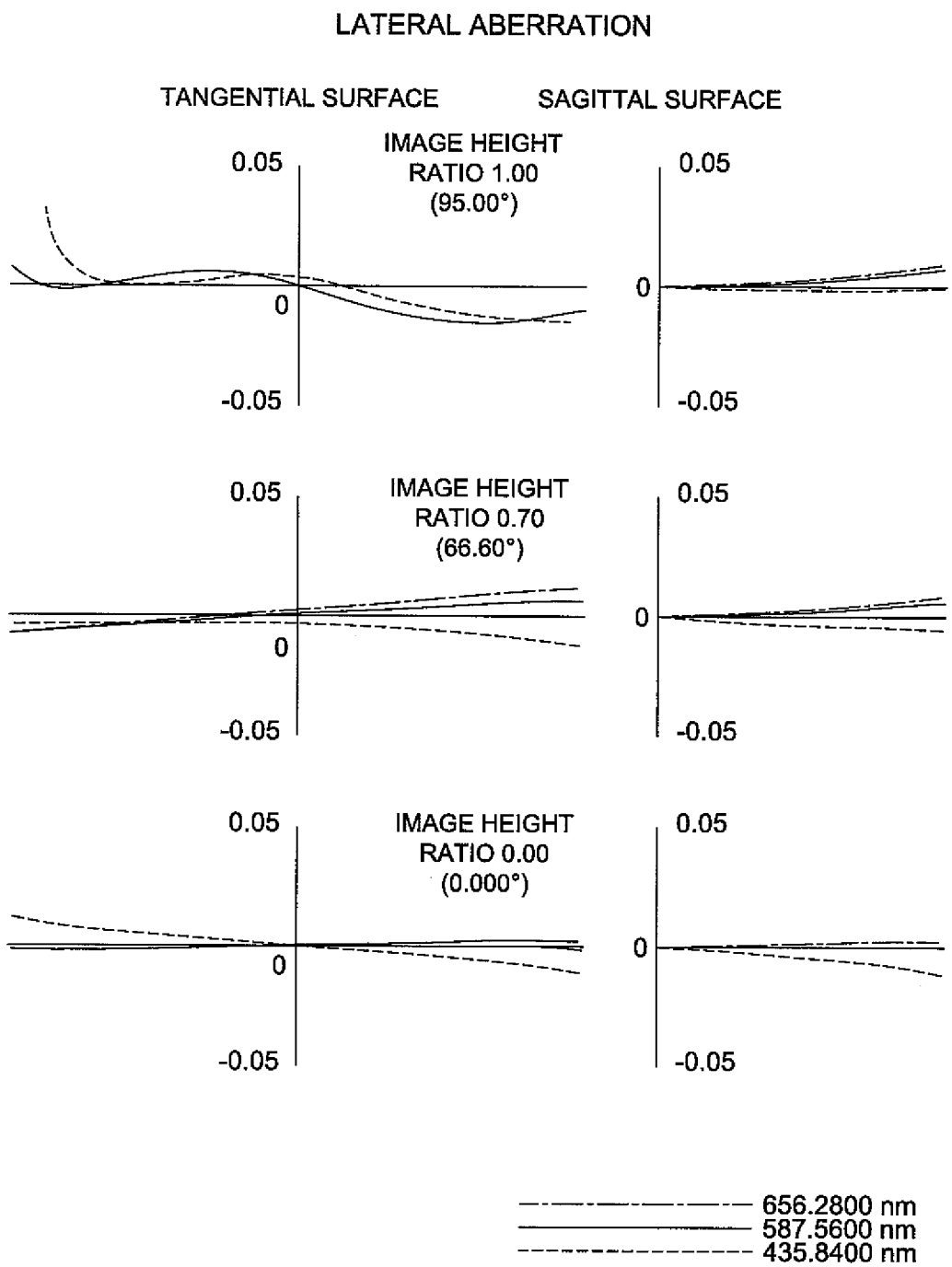

FIG. 10 is a sectional view showing an arrangement of lens groups in a wide-angle optical system of Example 6. FIGS. 25 and 26 show aberration diagrams of lens groups in a wide-angle optical system in Example 6.

Wide-angle optical system 1F of Example 6 is composed of, as shown in FIG. 10, front group Grf, aperture stop ST, and rear group Grr, in this order from the object side to the image side. The front group Grf is a three-component optical system with negative-negative-positive components, which is composed of a negative meniscus lens which is convex toward the object side (first lens L1), a negative meniscus lens which is convex toward the object side (second lens L2), and a positive bi-convex lens (third lens L3), in this order from the object side to the image side. The rear group Grr is a two-component optical system with positive-negative components, which is composed of a positive bi-convex lens (fourth lens L4) and a negative bi-concave lens (fifth lens L5) in this order from the object side to the image side. Each of the paired lenses arranged at the both sides of the aperture stop ST, which are the third lens L3 and the fourth lens L4, has a surface opposite from the aperture stop ST, namely the object-side surface of the third lend L3 and the image-side surface of the fourth lens L4, and they are convex surfaces. Each of the second through fifth lenses L2 to L5 has opposing surfaces which are aspheric surfaces, and is a lens made of a resin material, such as plastic.

On the image side of the rear group Grr (the image side of the fifth lens L5), there is arranged a light-receiving surface of image pickup element SR through parallel flat plate FT serving as a filter. The parallel flat plate FT indicates various types of optical filters and a cover glass of the image pickup element.

Construction data of respective lenses in wide-angle optical system 1F of Example 6 will be shown below.

Numerical Example 6

Unit mm

Surface data

| Surface Number | r | d | nd | vd |
|---|---|---|---|---|
| Object plane | ∞ | ∞ | | |
| 1 | 9.16 | 0.7 | 1.883 | 40.8 |
| 2 | 3.52 | 2.12 | | |
| 3* | 4.71 | 0.70 | 1.544 | 56 |
| 4* | 0.65 | 0.88 | | |
| 5* | 1.72 | 1.30 | 1.632 | 23.9 |
| 6* | −5.16 | 0.54 | | |
| 7(Stop) | ∞ | 0.28 | | |
| 8* | 2.51 | 1.19 | 1.544 | 56 |
| 9* | −0.56 | 0.07 | | |
| 10* | −1.44 | 0.50 | 1.632 | 23.9 |
| 11* | 2.94 | | | |
| 12 | ∞ | 0.336 | 1.564 | 47 |
| 13 | ∞ | 0.278 | | |
| Image plane | ∞ | | | |

Aspheric Surface data

Third surface $K = -16.7, A4 = -1.94E-02, A6 = 3.28E-03, A8 = -4.18E-04,$
$A10 = 3.96E-05$
Fourth surface $K = -1.9, A4 = 0.219, A6 = -1.04E-01, A8 = -2.30E-02,$
$A10 = 2.83E-02$ -continued Unit mm Fifth surface K = −2.5, A4 = 0.026, A6 = 4.17E−02, A8 = −6.85E−02,
A10 = 4.13E−02
Sixth surface K = 0, A4 = 0.051, A6 = −3.06E−02, A8 = 5.55E−02, A10 = −3.57E−02
Eighth surface K = 0, A4 = −0.117, A6 = 9.79E−02, A8 = 1.13E−02, A10 = −1.91E−01
Ninth surface K = −3.1, A4 = −0.282, A6 = 4.16E−02, A8 = 5.06E−02
Tenth surface K = −20.0, A4 = −0.369, A6 = −1.58E−01, A8 = 1.82E−01
Eleventh surface

K = −71.2, A4 = −0.334, A6 = 1.32E−01, A8 = −6.34E−03,
A10 = −1.65E−02

Various types of data

| Focal length | 0.716 |
|---|---|
| F number | 2.762 |
| Half angle of view | 95.000 |
| Image height | 1.628 |
| Total lens length | 9.857 |
| BF | 0.890 |

FIGS. 25A, 25B, 25C show spherical aberration (sine condition), astigmatism, and distortion of wide-angle optical system 1F of Example 6, obtained under the aforesaid lens arrangement and structure, and FIG. 26 shows its lateral aberrations.

Example 7

Figure 11:
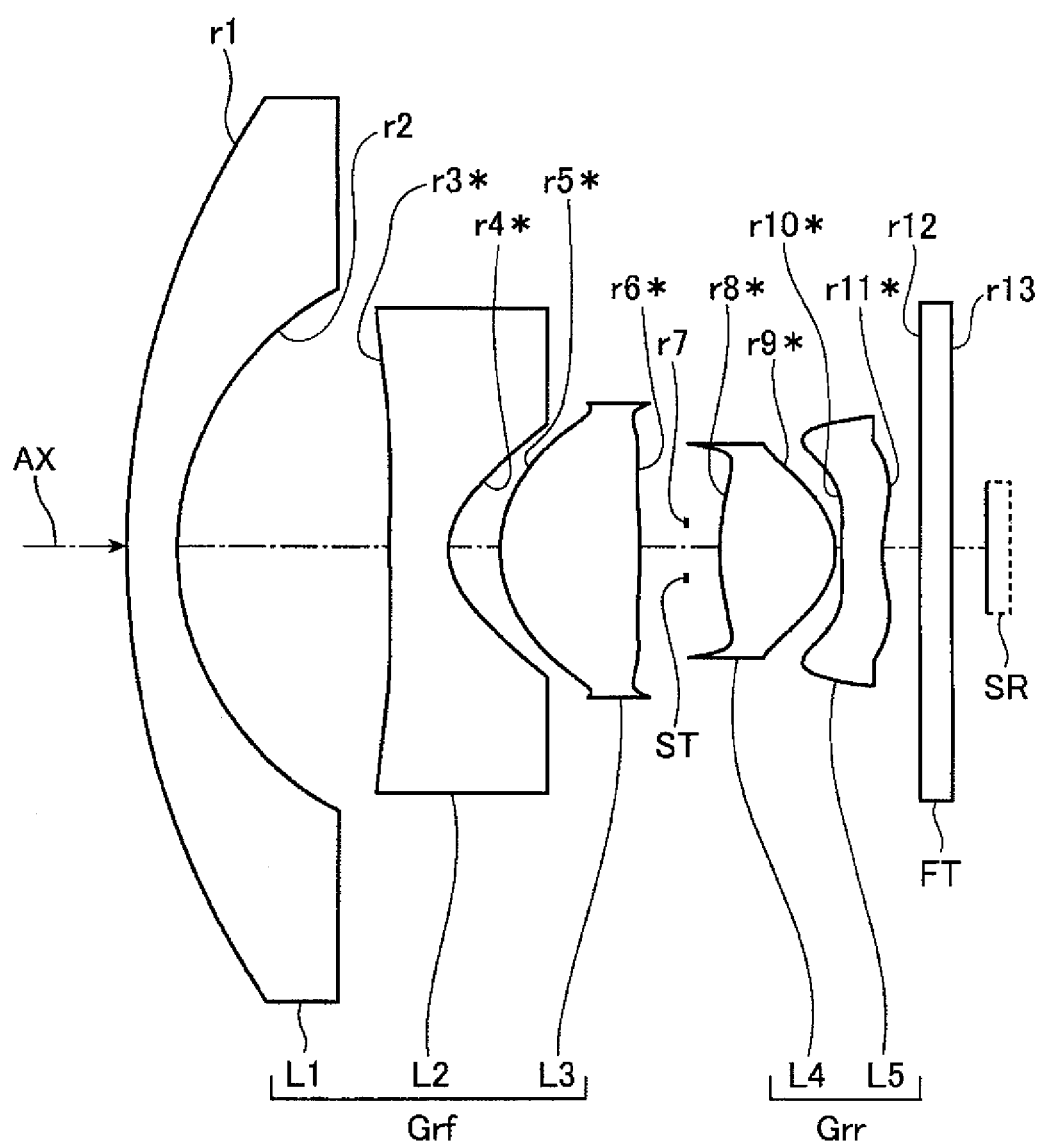
FIG. 11 is a sectional view showing an arrangement of lens groups in a wide-angle optical system of Example 7.
Figure 27:
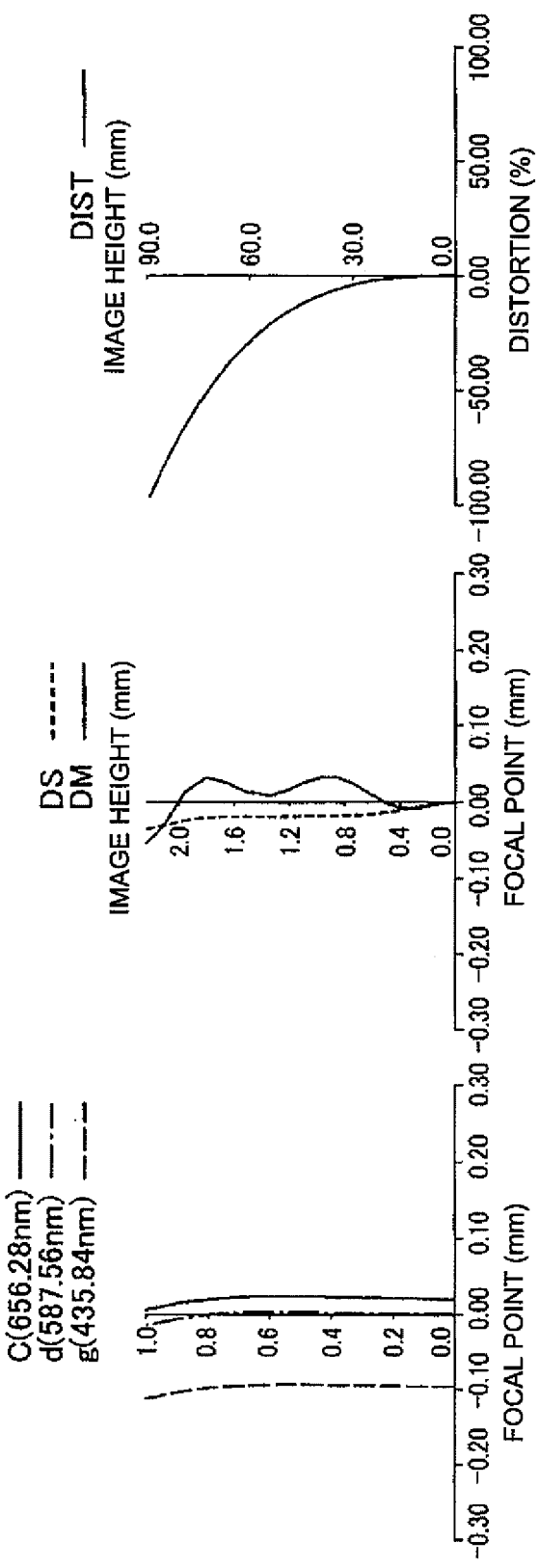
FIGS. 27A, 27B, 27C and 28 show aberration diagrams of lens groups in a wide-angle optical system in Example 7.
Figure 28:
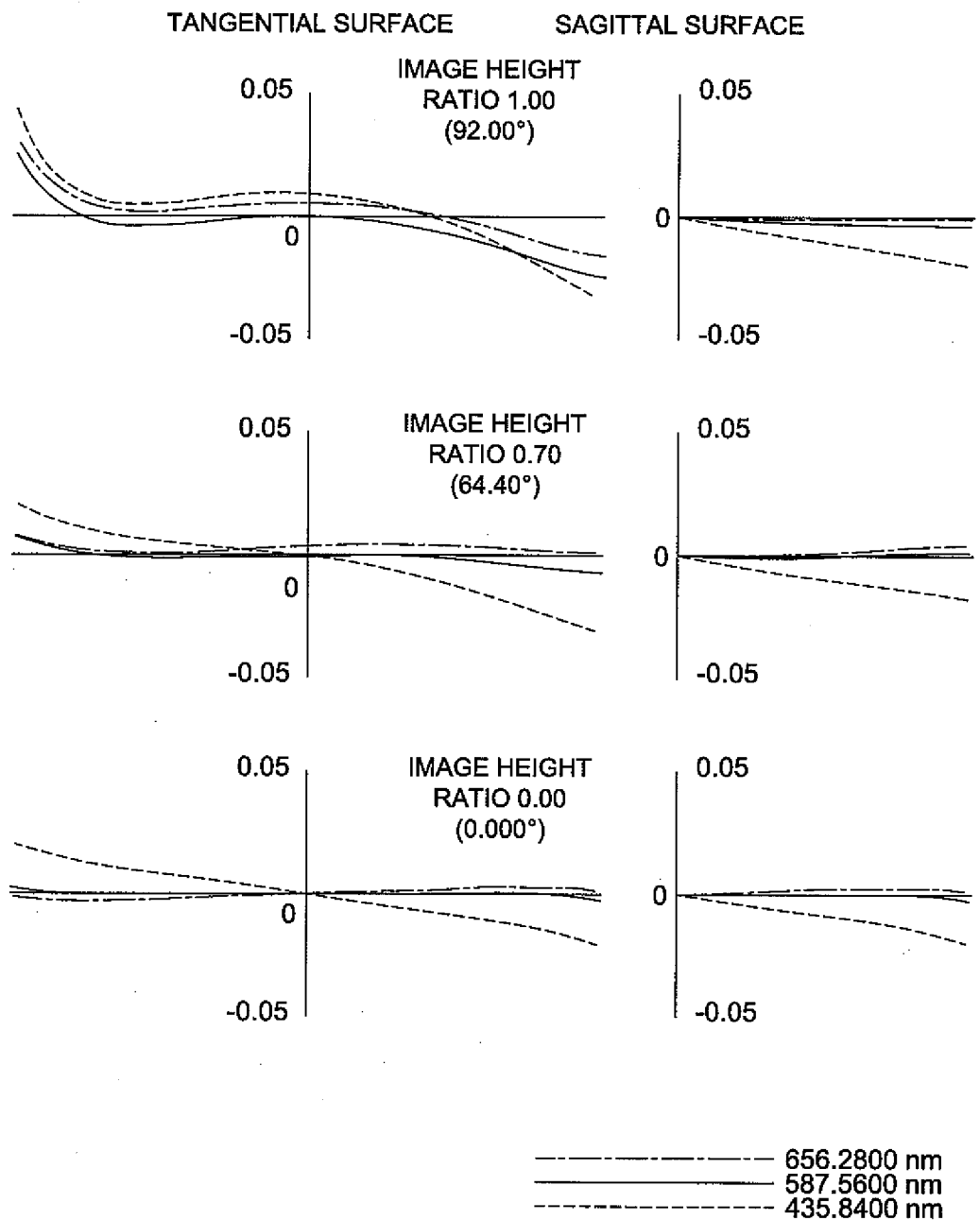

FIG. 11 is a sectional view showing an arrangement of lens groups in a wide-angle optical system of Example 7. FIGS. 27 and 28 show aberration diagrams of lens groups in a wide-angle optical system in Example 7.

Wide-angle optical system 1G of Example 7 is composed of, as shown in FIG. 11, front group Grf, aperture stop ST, and rear group Grr, in this order from the object side to the image side. The front group Grf is a three-component optical system with negative-negative-positive components, which is composed of a negative meniscus lens which is convex toward the object side (first lens L1), a negative meniscus lens which is convex toward the object side (second lens L2), and a positive bi-convex lens (third lens L3), in this order from the object side to the image side. The rear group Grr is a two-component optical system with positive-negative components, which is composed of a positive bi-convex lens (fourth lens L4) and a negative meniscus lens which is convex toward the object side (fifth lens L5) in this order from the object side to the image side. Each of the paired lenses arranged at the both sides of the aperture stop ST, which are the third lens L3 and the fourth lens LA, has a surface opposite from the aperture stop ST, namely the object-side surface of the third lend L3 and the image-side surface of the fourth lens L4, and they are convex surfaces. Each of the second through fifth lenses L2 to L5 has opposing surfaces which are aspheric surfaces, and is a lens made of a resin material, such as plastic.

On the image side of the rear group Grr (the image side of the fifth lens L5), there is arranged a light-receiving surface of image pickup element SR through parallel flat plate FT serving as a filter. The parallel flat plate FT indicates various types of optical filters and a cover glass of the image pickup element.

Construction data of respective lenses in wide-angle optical system 1G of Example 7 will be shown below.

Numerical Example 7

Unit mm

Surface data

| Surface Number | r | d | nd | vd |
|---|---|---|---|---|
| Object plane | ∞ | ∞ | | |
| 1 | 14.04 | 0.8 | 1.883 | 40.8 |
| 2 | 5.02 | 3.34 | | |
| 3* | 45.95 | 0.92 | 1.531 | 56 |
| 4* | 1.20 | 0.82 | | |
| 5* | 2.26 | 2.20 | 1.632 | 23 |
| 6* | −9.00 | 0.72 | | |
| 7(Stop) | ∞ | 0.52 | | |
| 8* | 3.89 | 1.83 | 1.531 | 56 |
| 9* | −1.16 | 0.10 | | |
| 10* | 9.57 | 0.65 | 1.632 | 23 |
| 11* | 2.26 | | | |
| 12 | ∞ | 0.500 | 1.564 | 47 |
| 13 | ∞ | 0.510 | | |
| Image plane | ∞ | | | |

Aspheric Surface data

Third surface

K = −2.0, A4 = −3.91E−03, A6 = 1.94E−04, A8 = −5.42E−06,
A10 = 3.72E−07
Fourth surface K = −2.8, A4 = 0.109, A6 = −3.56E−02, A8 = 3.73E−03,
A10 = 2.28E−04
Fifth surface K = −2.7, A4 = 0.027, A6 = 2.05E−03, A8 = −4.11E−03,
A10 = 1.31E−03
Sixth surface K = 0, A4 = 0.026, A6 = −1.23E−03, A8 = 1.58E−04, A10 = −5.36E−04
Eighth surface K = 0, A4 = −0.041, A6 = 4.17E−02, A8 = −3.80E−02, A10 = 1.95E−02
Ninth surface K = −1.3, A4 = 0.006, A6 = −1.60E−02, A8 = 5.19E−03
Tenth surface K = −4.8, A4 = −0.101, A6 = −1.52E−02, A8 = 7.25E−03
Eleventh surface

K = −2.0, A4 = −0.125, A6 = 1.90E−02, A8 = 4.72E−04,
A10 = −6.35E−04

Various types of data

| Focal length | 1.11 |
|---|---|
| F number | 2.875 |
| Half angle of view | 92.000 |
| Image height | 2.328 |
| Total lens length | 15.258 |
| BF | 1.368 |

FIGS. 27A, 27B, 27C show spherical aberration (sine condition), astigmatism, and distortion of wide-angle optical system 1G of Example 7, obtained under the aforesaid lens arrangement and structure, and FIG. 28 shows its lateral aberrations.

Example 8

Figure 12:
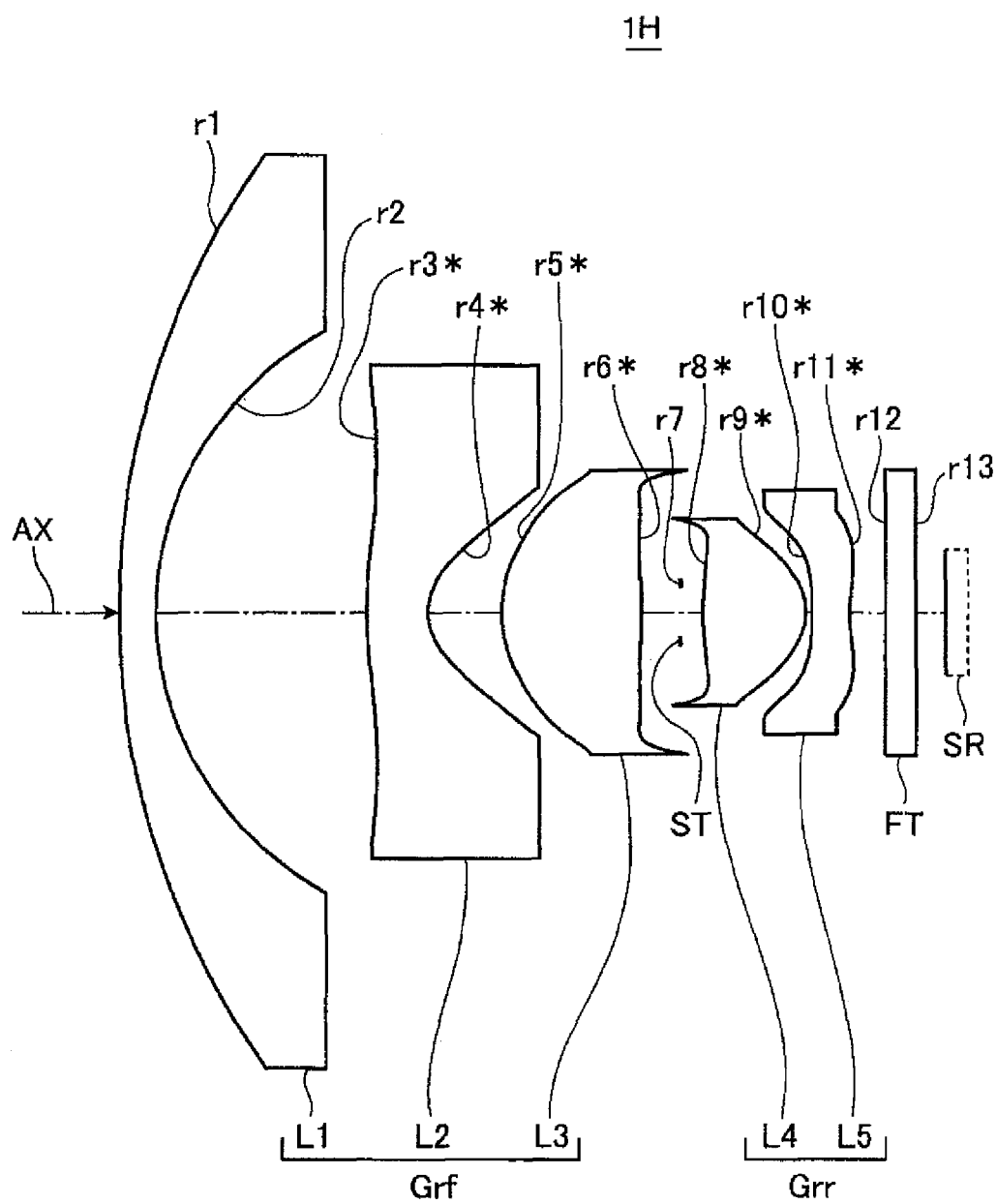
FIG. 12 is a sectional view showing an arrangement of lens groups in a wide-angle optical system of Example 8.

FIG. 12 is a sectional view showing an arrangement of lens groups in a wide-angle optical system of Example 8. FIGS. 29 and 30 show aberration diagrams of lens groups in a wide-angle optical system in Example 8.

Wide-angle optical system 1H of Example 8 is composed of; as shown in FIG. 12, front group Grf, aperture stop ST, and rear group Grr in this order from the object side to the image side. The front group Grf is a three-component optical system with negative-negative-positive components, which is composed of a negative meniscus lens which is convex toward the object side (first lens L1), a negative meniscus lens which is convex toward the object side (second lens L2), and a positive bi-convex lens (third lens L3), in this order from the object side to the image side. The rear group Grr is a two-component optical system with positive-negative components, which is composed of a positive bi-convex lens (fourth lens L4) and a negative bi-concave lens (fifth lens L5) in this order from the object side to the image side. Each of the paired arranged at the both sides of the aperture stop ST, which are the third lens L3 and the fourth lens L4, has a surface opposite from the aperture stop ST, namely the object-side surface of the third lend L3 and the image-side surface of the fourth lens L4, and they are convex surfaces. Each of the second through fifth lenses L2 to L5 has opposing surfaces which are aspheric surfaces, and is a lens made of a resin material, such as plastic.

On the image side of the rear group Grr (the image side of the fifth lens L5), there is arranged a light-receiving surface of image pickup element SR through parallel flat plate FT serving as a filter. The parallel flat plate FT indicates various types of optical filters and a cover glass of the image pickup element.

Construction data of respective lenses in wide-angle optical system 1H of Example 8 will be shown below.

Numerical Example 8

| Unit mm | | | | |
|---|---|---|---|---|
| Surface data | | | | |
| Surface Number | r | d | nd | vd |
| Object plane | ∞ | ∞ | | |
| 1 | 16.49 | 0.70 | 1.883 | 40.8 |
| 2 | 6.59 | 4.00 | | |
| 3* | 8.16 | 1.16 | 1.531 | 56 |
| 4* | 1.11 | 1.40 | | |
| 5* | 2.65 | 2.66 | 1.632 | 23 |
| 6* | −11.16 | 0.74 | | |
| 7(Stop) | ∞ | 0.44 | | |
| 8* | 5.87 | 1.96 | 1.531 | 56 |
| 9* | −1.07 | 0.12 | | |
| 10* | −14.87 | 0.70 | 1.632 | 23 |
| 11* | 2.44 | | | |
| 12 | ∞ | 0.583 | 1.564 | 47 |
| 13 | ∞ | 0.646 | | |
| Image plane | ∞ | | | |

Aspheric Surface data

Third surface

K = −30, A4 = −2.55E−03, A6 = 9.50E−05, A8 = −2.44E−06, A10 = 7.48E−08
Fourth surface K = −2.3, A4 = 0.073, A6 = −1.77E−02, A8 = 1.23E−03, A10 = 6.75E−05
Fifth surface

K = −3.4, A4 = 0.014, A6 = 1.13E−03, A8 = −1.47E−03, A10 = 3.19E−04

-continued

| Unit mm |
|---|
| Sixth surface |

K = 0, A4 = 0.01, A6 = 4.78E−04, A8 = 5.31E−04, A10 = −2.93E−04
Eighth surface

K = 0, A4 = −0.037, A6 = 1.62E−02, A8 = −9.15E−03, A10 = 4.81E−03
Ninth surface

K = −2.4, A4 = −0.030, A6 = −1.55E−02, A8 = 4.69E−03
Tenth surface

K = −20.0, A4 = −0.062, A6 = −3.70E−03, A8 = 1.98E−03
Eleventh surface

K = −19.1, A4 = −0.066, A6 = 1.06E−02, A8 = −2.64E−04, A10 = −2.40E−04

| Various types of data | |
|---|---|
| Focal length | 1.283 |
| F number | 2.762 |
| Half angle of view | 92.500 |
| Image height | 2.669 |
| Total lens length | 16.574 |
| BF | 1.707 |

FIGS. 29A, 29B, 29C show spherical aberration (sine condition), astigmatism, and distortion of wide-angle optical system 1H of Example 8, obtained under the aforesaid lens arrangement and structure, and FIG. 30 shows its lateral aberrations.

Example 9

Figure 13:
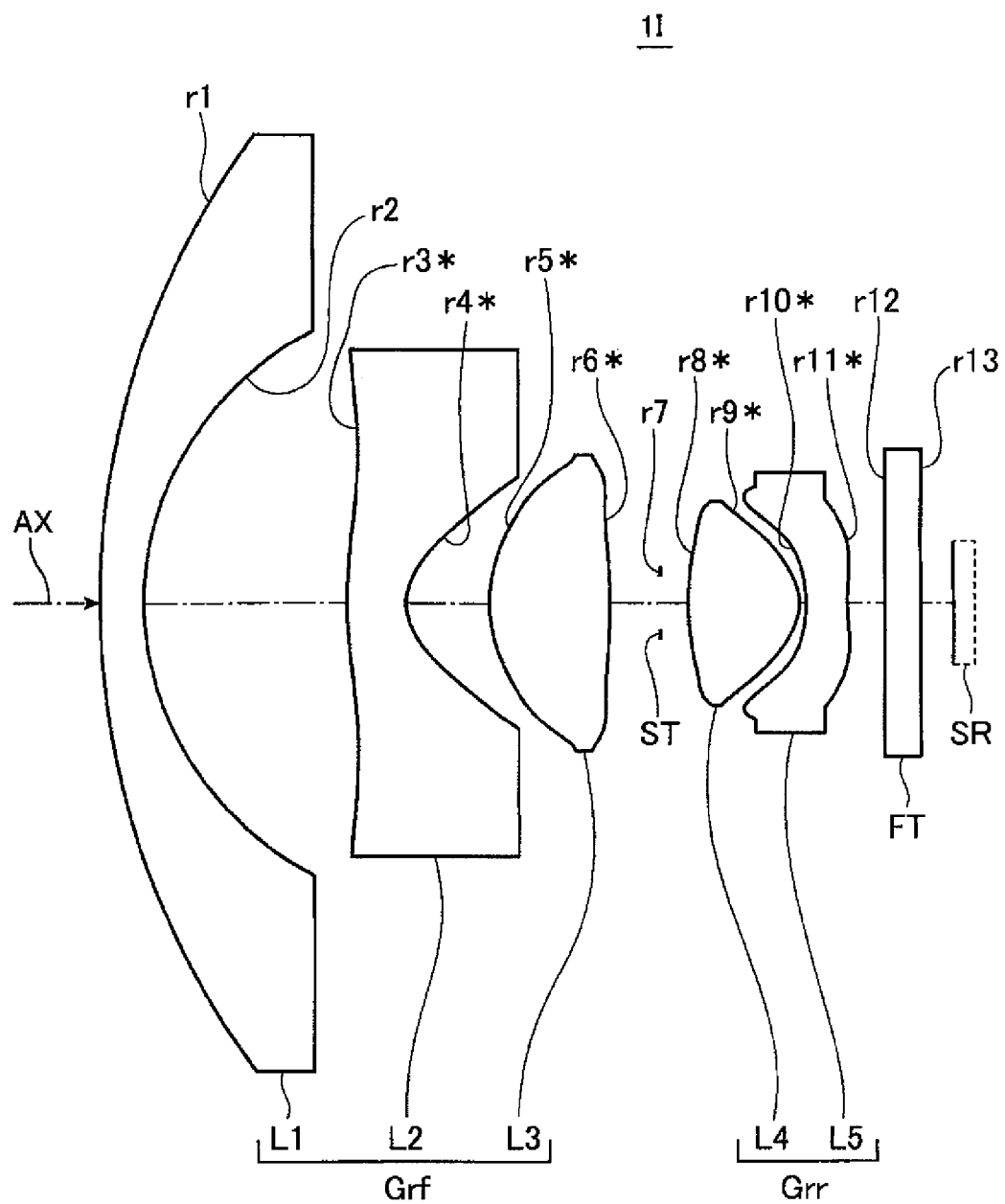
FIG. 13 is a sectional view showing an arrangement of lens groups in a wide-angle optical system of Example 9.

FIG. 13 is a sectional view showing an arrangement of lens groups in a wide-angle optical system of Example 9. FIGS. 31 and 32 show aberration diagrams of lens groups in a wide-angle optical system in Example 9.

Wide-angle optical system 1I of Example 9 is composed of, as shown in FIG. 13, front group Grf, aperture stop ST, and rear group Grr, in this order from the object side to the image side. The front group Grf is a three-component optical system with negative-negative-positive components, which is composed of a negative meniscus lens which is convex toward the object side (first lens L1), a negative meniscus lens which is convex toward the object side (second lens L2), and a positive bi-convex lens (third lens L3), in this order from the object side to the image side. The rear group Grr is a two-component optical system with positive-negative components, which is composed of a positive bi-convex lens (fourth lens L4) and a negative bi-concave lens (fifth lens L5) in this order from the object side to the image side. Each of the paired lenses arranged at the both sides of the aperture stop ST, which are the third lens L3 and the fourth lens L4, has a surface opposite from the aperture stop ST, namely the object-side surface of the third lend L3 and the image-side surface of the fourth lens L4, and they are convex surfaces. Each of the second through fifth lenses L2 to L5 has opposing surfaces which are aspheric surfaces, and is a lens made of a resin material, such as plastic.

On the image side of the rear group Grr (the image side of the fifth lens L5), there is arranged a light-receiving surface of image pickup element SR through parallel flat plate FT serving as a filter. The parallel flat plate FT indicates various types of optical filters and a cover glass of the image pickup element.

Construction data of respective lenses in wide-angle optical system 1I of Example 9 will be shown below.

Numerical Example 9

| Unit mm | | | | |
|---|---|---|---|---|
| Surface data | | | | |
| Surface Number | r | d | nd | vd |
| Object plane | ∞ | ∞ | | |
| 1 | 11.80 | 0.60 | 1.883 | 40.8 |
| 2 | 4.48 | 2.77 | | |
| 3* | 6.09 | 0.81 | 1.531 | 56 |
| 4* | 0.83 | 1.13 | | |
| 5* | 2.18 | 1.65 | 1.614 | 26 |
| 6* | −6.66 | 0.69 | | |
| 7(Stop) | ∞ | 0.37 | | |
| 8* | 3.23 | 1.53 | 1.531 | 56 |
| 9* | −0.72 | 0.09 | | |
| 10* | −2.06 | 0.57 | 1.614 | 26 |
| 11* | 3.10 | | | |
| 12 | ∞ | 0.500 | 1.564 | 47 |
| 13 | ∞ | 0.433 | | |
| Image plane | ∞ | | | |

Aspheric Surface data

Third surface

K = −15, A4 = −8.69E−03, A6 = 5.70E−04, A8 = −1.94E−05,
A10 = 1.09E−06
Fourth surface K = −2.3, A4 = 0.174, A6 = −7.55E−02, A8 = 9.62E−03,
A10 = 1.14E−03
Fifth surface K = −2.2, A4 = 0.009, A6 = 1.28E−02, A8 = −1.25E−02,
A10 = 4.65E−03
Sixth surface K = 0, A4 = 0.024, A6 = −8.61E−03, A8 = 9.68E−03, A10 = −3.75E−03
Eighth surface K = 0, A4 = −0.056, A6 = 2.84E−02, A8 = −4.29E−03,
A10 = −1.38E−02
Ninth surface K = −3, A4 = −0.129, A6 = 1.31E−02, A8 = 6.35E−03
Tenth surface K = −20, A4 = −0.180, A6 = −4.64E−02, A8 = 3.32E−02
Eleventh surface

K = −56.8, A4 = −0.166, A6 = 3.91E−02, A8 = −1.03E−03,
A10 = −1.71E−03

| Various types of data | |
|---|---|
| Focal length | 0.919 |
| F number | 2.762 |
| Half angle of view | 92.000 |
| Image height | 1.907 |
| Total lens length | 13.451 |
| BF | 1.258 |

FIGS. 31A, 31B, 31C show spherical aberration (sine condition), astigmatism, and distortion of wide-angle optical system 1I of Example 9, obtained under the aforesaid lens arrangement and structure, and FIG. 32 shows its lateral aberrations.

Example 10

Figure 14:
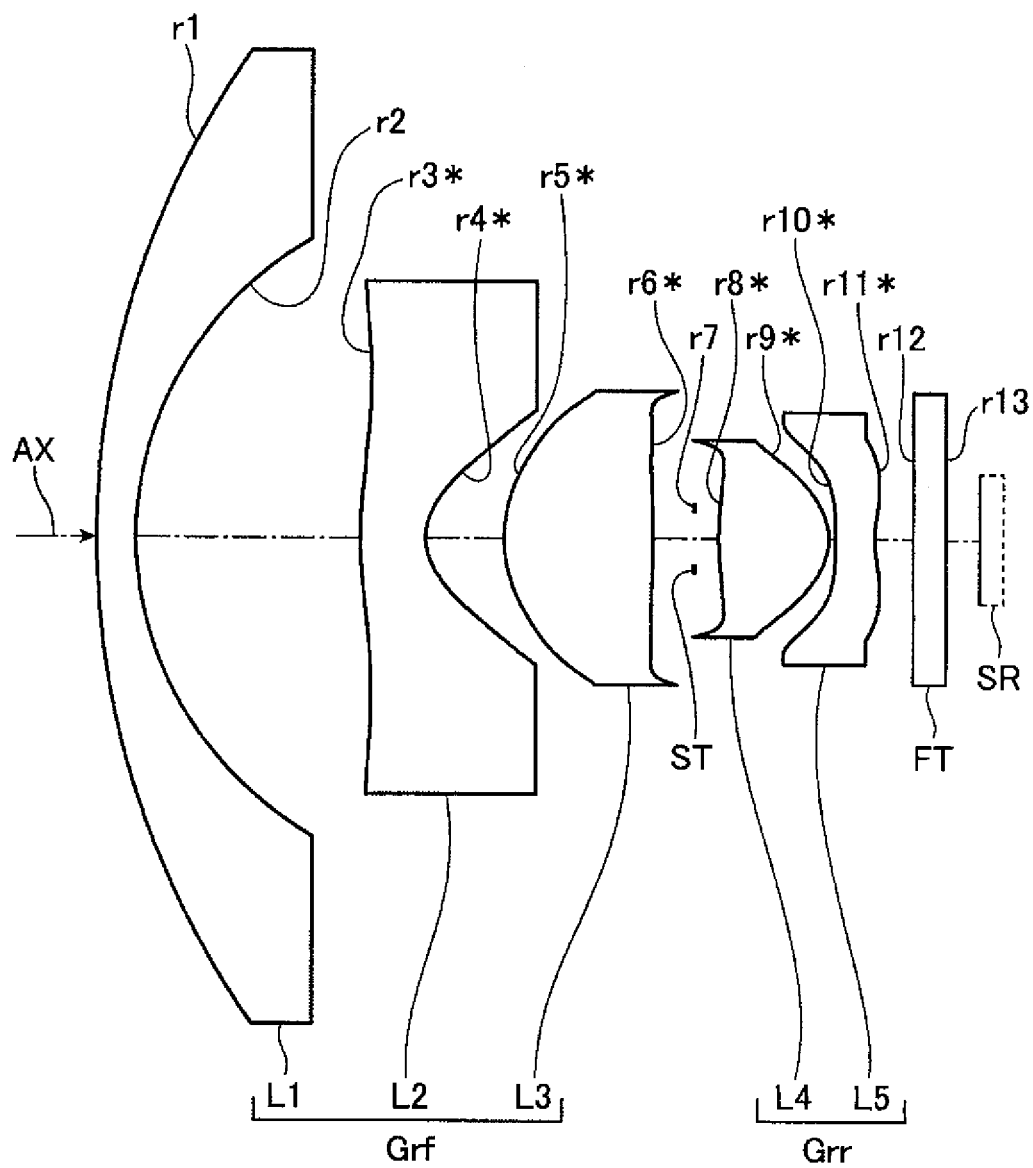
FIG. 14 is a sectional view showing an arrangement of lens groups in a wide-angle optical system of Example 10.

FIG. 14 is a sectional view showing an arrangement of lens groups in a wide-angle optical system of Example 10. FIGS. 33 and 34 show aberration diagrams of lens groups in a wide-angle optical system in Example 10.

Wide-angle optical system 1J of Example 10 is composed of, as shown in FIG. 14, front group Grf, aperture stop ST, and rear group Grr, in this order from the object side to the image side. The front group Grf is a three-component optical system with negative-negative-positive components, which is composed of a negative meniscus lens which is convex toward the object side (first lens L1), a negative meniscus lens which is convex toward the object side (second lens L2), and a positive bi-convex lens (third lens L3), in this order from the object side to the image side. The rear group Grr is a two-component optical system with positive-negative components, which is composed of a positive bi-convex lens (fourth lens L4) and a negative bi-concave lens (fifth lens L5) in this order from the object side to the image side. Each of the paired lenses arranged at the both sides of the aperture stop ST, which are the third lens L3 and the fourth lens L4, has a surface opposite from the aperture stop ST, namely the object-side surface of the third lend L3 and the image-side surface of the fourth lens L4, and they are convex surfaces. Each of the second through fifth lenses L2 to L5 has opposing surfaces which are aspheric surfaces, and is a lens made of a resin material, such as plastic.

On the image side of the rear group Grr (the image side of the fifth lens L5), there is arranged a light-receiving surface of image pickup element SR through parallel flat plate FT serving as a filter. The parallel flat plate FT indicates various types of optical filters and a cover glass of the image pickup element.

Construction data of respective lenses in wide-angle optical system 1J of Example 10 will be shown below.

Numerical Example 10

| Unit mm | | | | |
|---|---|---|---|---|
| Surface data | | | | |
| Surface Number | r | d | nd | vd |
| Object plane | ∞ | ∞ | | |
| 1 | 14.14 | 0.60 | 1.883 | 40.8 |
| 2 | 5.65 | 3.43 | | |
| 3* | 7.00 | 0.99 | 1.531 | 56 |
| 4* | 1.00 | 1.20 | | |
| 5* | 2.27 | 2.28 | 1.583 | 30.48 |
| 6* | −9.57 | 0.63 | | |
| 7(Stop) | ∞ | 0.37 | | |
| 8* | 5.04 | 1.68 | 1.531 | 56 |
| 9* | −0.92 | 0.10 | | |
| 10* | −12.75 | 0.60 | 1.583 | 30.48 |
| 11* | 2.09 | 0.59 | | |
| 12 | ∞ | 0.500 | 1.564 | 47 |
| 13 | ∞ | 0.561 | | |
| Image plane | ∞ | | | |

Aspheric Surface data

Third surface

K = −30, A4 = −4.04E−03, A6 = 2.05E−04, A8 = −7.16E−06,
A10 = 2.99E−07
Fourth surface

K = −2.3, A4 = 0.116, A6 = −3.81E−02, A8 = 3.62E−03,
A10 = 2.70E−04

-continued

Unit mm

Fifth surface $K = -3.4, A4 = 0.022, A6 = 2.44E-03, A8 = -4.32E-03,$
$A10 = 1.27E-03$
Sixth surface $K = 0, A4 = 0.016, A6 = 1.03E-03, A8 = 1.56E-03, A10 = -1.17E-03$
Eighth surface $K = 0, A4 = -0.058, A6 = 3.49E-02, A8 = -2.69E-02, A10 = 1.92E-02$
Ninth surface $K = -2.4, A4 = -0.047, A6 = -3.35E-02, A8 = 1.38E-02$
Tenth surface $K = -20.0, A4 = -0.098, A6 = -7.98E-03, A8 = 5.80E-03$
Eleventh surface $K = -19.1, A4 = -0.104, A6 = 2.28E-02, A8 = -7.74E-04,$
$A10 = -9.56E-04$ Various types of data

| | |
|---|---|
| Focal length | 1.064 |
| F number | 2.762 |
| Half angle of view | 93.000 |
| Image height | 2.140 |
| Total lens length | 14.361 |
| BF | 1.471 |

FIGS. 33A, 33B, 33C show spherical aberration (sine condition), astigmatism, and distortion of wide-angle optical system 1J of Example 10, obtained under the aforesaid lens arrangement and structure, and FIG. 34 shows its lateral aberrations.

Table 1 and Table 2 show numerical values obtained by using the aforesaid conditional expressions (1) to (10) for variable power optical systems 1A-1J in the aforesaid Examples 1 through 10.

As stated above, wide-angle optical systems 1A to 1J in the aforesaid Examples 1 to 10 satisfy the required conditions relating to the present invention. As a result, the wide-angle optical systems can cope with the increased number of pixels of the image pickup element, have more excellent optical properties, and achieve downsizing sufficiently for being mounted on digital apparatus, especially for being mounted on an onboard monitor camera or on a mobile terminal. In addition, the wide-angle optical systems 1A to 1J in the aforesaid Examples 1 to 10 are capable of achieving a super wide angle that is a total angle of view of especially 180° or more, or that is more concretely 200° or more.

Although the present invention has been fully and appropriately described in the foregoing by way of embodiments with reference to the accompanying drawings, it is to be understood that various changes and improvements will be apparent to those skilled in the art. Therefore, unless otherwise such changes and improvements depart from the scope of the present invention descried in claims hereinafter defined, they should be construed as being included therein.

REFERENCE SIGNS LIST

| | |
|---|---|
| AX | Optical axis |
| 1, 1A - 1J | Wide-angle optical system |
| 3 | Digital apparatus |
| 5 | Cell-phone |
| 7 | Monitor camera |
| 9 | Vehicle |
| 11, Grf | Front group |
| 12, ST | Stop |
| 13, Grr | Rear group |
| 15, SR | Image pickup element |
| 111, L1 | First lens |
| 112, L2 | Second lens |
| 113, L3 | Third lens |

TABLE 1

| | | Example 1 | Example 2 | Example 3 | Example 4 | Example 5 |
|---|---|---|---|---|---|---|
| Conditional expression (1) | Rfs/Rrs | −2.86 | −3.09 | −3.09 | −2.43 | −3.09 |
| Conditional expression (2) | Ffs/Frs | 2.04 | 2.27 | 2.24 | 1.82 | 2.24 |
| Conditional expression (3) | vd4/vd3 | 2.43 | 2.43 | 2.43 | 2.34 | 2.43 |
| Conditional expression (4) | vd4/vd5 | 2.43 | 2.43 | 2.43 | 2.34 | 2.43 |
| Conditional expression (5) | Ff/Fr | 12.87 | 11.91 | 9.95 | 13.70 | 9.95 |
| Conditional expression (6) | F3/F12 | −2.36 | −2.36 | −2.23 | −2.38 | −2.33 |
| Conditional expression (7) | F5/F4 | −1.52 | −1.51 | −1.51 | −1.82 | −1.49 |
| Conditional expression (8) | DA1 | 0.14 | 0.14 | 0.14 | 0.14 | 0.14 |
| Conditional expression (9) | Hk1 | 730 | 730 | 730 | 730 | 730 |
| Conditional expression (10) | DS1 | <0.01 | <0.01 | <0.01 | <0.01 | <0.01 |

TABLE 2

| | | Example 6 | Example 7 | Example 8 | Example 9 | Example 10 |
|---|---|---|---|---|---|---|
| Conditional expression (1) | Rfs/Rrs | −3.09 | −1.95 | −2.47 | −3.03 | −2.47 |
| Conditional expression (2) | Ffs/Frs | 2.26 | 1.59 | 1.93 | 2.25 | 2.09 |
| Conditional expression (3) | vd4/vd3 | 2.33 | 2.43 | 2.43 | 2.15 | 1.84 |
| Conditional expression (4) | vd4/vd5 | 2.34 | 2.43 | 2.43 | 2.15 | 1.84 |
| Conditional expression (5) | Ff/Fr | 10.71 | 227.17 | 10.16 | 19.08 | 167.05 |
| Conditional expression (6) | F3/F12 | −2.31 | −2.18 | −2.22 | −2.41 | −2.29 |
| Conditional expression (7) | F5/F4 | −1.50 | −2.51 | −1.72 | −1.51 | −1.87 |
| Conditional expression (8) | DA1 | 0.14 | 0.14 | 0.14 | 0.14 | 0.14 |
| Conditional expression (9) | Hk1 | 730 | 730 | 730 | 730 | 730 |
| Conditional expression (10) | DS1 | <0.01 | <0.01 | <0.01 | <0.01 | <0.01 |

-continued

REFERENCE SIGNS LIST

| 131, L4 | Fourth lens |
|---|---|
| 132, L5 | Fifth lens |

The invention claimed is:

1. A wide-angle optical system comprising, in order from an object side to an image side:
   a front group;
   a stop; and
   a rear group,
   wherein the front group comprises, in order from the object side to the image side,
      a first lens having a negative optical power,
      a second lens having a negative optical power, and
      a third lens having a positive optical power,
   the rear group comprises, in order from the object side to the image side,
      a fourth lens having a positive optical power, and
      a fifth lens having a negative optical power,
   an opposite surface from the stop of each of a pair of lenses which are arranged at the both sides of the stop is a convex surface, and
   the wide-angle optical system satisfies the following conditional expressions:

$1.7 < vd4/vd3 < 2.7$ (3), $2.43 \geq vd4/vd5 > 1.5$ (4), $Ff/Fr > 0$ (5), $-2 < F5/F4 < -1$ (7), where vd3 is an Abbe number of the third lens,
   vd4 is an Abbe number of the fourth lens,
   vd5 is an Abbe number of the fifth lens,
   Ff is a focal length of the front group,
   Fr is a focal length of the rear group,
   F4 is a focal length of the fourth lens, and
   F5 is a focal length of the fifth lens.

2. The wide-angle optical system of claim 1, satisfying the following conditional expression (1):

$Rfs/Rrs < 0$ (1), where Rfs is a curvature radius of an object-side surface of a lens which is arranged at the object side of the stop and is closest to the stop, and Rrs is a curvature radius of an image-side surface of a lens which is arranged at the image side of the stop and is closest to the stop.

3. The wide-angle optical system of claim 1, satisfying the following conditional expression (2):

$1 < Ffs/Frs < 4$ (2), where Ffs is a focal length of a lens which is arranged at the object side of the stop and is closest to the stop and Frs is a focal length of a lens which is arranged at the image side of the stop and is closest to the stop.

4. The wide-angle optical system of claim 1, wherein each of the second through fifth lenses comprises at least one aspheric surface.

5. The wide-angle optical system of claim 1, satisfying the following conditional expression (6):

$-1.5 > F3/F12 > -2.8$ (6), where F3 is a focal length of the third lens and F12 is a composite focal length of the first lens and the second lens.

6. The wide-angle optical system of claim 1, wherein the first lens is a lens made of a glass material.

7. The wide-angle optical system of claim 1, wherein the second lens is a lens made of a resin material and comprising at least one aspheric surface.

8. The wide-angle optical system of claim 1, wherein the third lens is a lens made of a resin material and comprising at least one aspheric surface.

9. The wide-angle optical system of claim 1, wherein the fourth lens is a lens made of a resin material and comprising at least one aspheric surface.

10. The wide-angle optical system of claim 1, wherein the fifth lens is a lens made of a resin material and comprising at least one aspheric surface.

11. An image pickup apparatus comprising:
    the wide-angle optical system of claim 1; and
    an image pickup element for picking up an optical image of a subject formed by the wide-angle optical system.

12. The image pickup apparatus of claim 11, comprising an image processing section for processing an output of the image pickup element with a predetermined image processing.

13. The image pickup apparatus of claim 12, wherein the predetermined image processing includes a distortion-correcting processing which corrects a distortion in the optical image of the subject formed on a light-receiving surface of the image pickup element.

* * * * *